United States Patent
Lin et al.

(10) Patent No.: US 10,674,484 B2
(45) Date of Patent: Jun. 2, 2020

(54) METHOD AND APPARATUS FOR IMPROVING UPLINK GRANTS IN A SHORTENED TRANSMISSION TIME INTERVAL (TTI) IN A WIRELESS COMMUNICATION SYSTEM

(71) Applicant: ASUSTek Computer Inc., Taipei (TW)

(72) Inventors: Ko-Chiang Lin, Taipei (TW); Li-Chih Tseng, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 104 days.

(21) Appl. No.: 15/592,734

(22) Filed: May 11, 2017

(65) Prior Publication Data

US 2017/0332365 A1  Nov. 16, 2017

Related U.S. Application Data

(60) Provisional application No. 62/335,335, filed on May 12, 2016, provisional application No. 62/335,449, filed on May 12, 2016.

(51) Int. Cl.
*H04W 72/04* (2009.01)
*H04L 5/00* (2006.01)

(52) U.S. Cl.
CPC ....... *H04W 72/0406* (2013.01); *H04L 5/0044* (2013.01); *H04L 5/0053* (2013.01); *H04L 5/0091* (2013.01); *H04L 5/0007* (2013.01); *H04W 72/044* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,665,822 B2 | 3/2014 | Tseng | |
| 2016/0128028 A1* | 5/2016 | Mallik | H04W 72/042 370/336 |

FOREIGN PATENT DOCUMENTS

| WO | 2016040290 | 3/2016 |
|---|---|---|

OTHER PUBLICATIONS

3G PP TSG-RAN WG1 Meeting #84bis, Busan, Korea, Apr. 11-15, 2016, Tdoc R1-162534.
3GPP TSG-RAN WG1 Meetting #84bis, Busan, Korea, Apr. 11-15, 2016, Tdoc R1-162115.
Office Action on corresponding JP Patent Application No. 2017-094488, dated Jun. 12, 2018.
Huawei, HiSilicon, "Short TTI for DL transmissions", R1-160292, 3GPF TSG RAN WG1 Meeting #84, Feb. 15-19, 2016.
(Continued)

*Primary Examiner* — Kent Krueger
(74) *Attorney, Agent, or Firm* — Blue Capital Law Firm, P.C.

(57) ABSTRACT

A method and apparatus are disclosed for performing uplink transmission in a wireless communication system. In one embodiment, the method includes the UE monitors a plurality of occasions for a DL control channel within a DL data region within one subframe, wherein a first control channel in a first occasion corresponds to a first UL data channel with a first duration, and wherein a second control channel in a second occasion corresponds to a second UL data channel with a second duration.

16 Claims, 32 Drawing Sheets

(56) References Cited

OTHER PUBLICATIONS

Panasonic, "Discussion on processing time reduction in physical layer", R1-162534, 3GPP TSG RAN WG1 Meeting #84bis, Apr. 11-15, 2016.

Office Action from the Taiwan Intellectual Property Office in the corresponding TW Application No. 106115677, dated Sep. 25, 2018.

Huawei.et.al: "Short TTI for DL transmission" 3GPP Draft; R1-160292, 3rd Generation Partnership Project (3GPP), Mobile Competence Centre ; 650, Route Des Lucioles ; F-06921 Sophia-Antipolis Cedex ;France vol. RAN WG1, no. St. Julian's, Malta; Feb. 15, 2016-2016Q219 Feb. 6, 2016 (Feb. 6, 2016), XPQ5106411Q, Retrieved from the Internet: URL: http://www.3gpp.ofg/ftp/tsg_ran/WG1_RL1/TSGR1_84/Docs/.

Ericsson: "Downlink control signaling design for short TTI", 3GPP Draft; R1-163322_D0WNLINK Control Signal Desing for Short TTI, 3rd Generation Partnership Project (3GPP), Mobile Competence Centre ; 650, Route Des Lucioles ; F-06921 Sophia-Antipolis Cedex ;FRA vol. RAN WG1, no. Busan; Apr. 11, 2016-Apr. 15, 2016 Apr. 1, 2016 (Apr. 1, 2016), XP051079812, Retrieved from the Internet: https://www.3gpp.org/DynaReport/TDocExMtg--R1-84b--31661.htm.

ETRI: "Discussion on TTI shortening", 3GPP Draft; R1-157110 Discussion on TTI Shortening, 3rd Generation Partnership Project (3GPP), Mobile Competence Centre ; 650, Route Des Lucioles ; F-06921 Sophia-Antipolis Cedex ; France vol. RAN WG1, no. Anaheim, USA; Nov. 16, 2015-Nov. 20, 2015 Nov. 15, 2015 (Nov. 15, 2015), XP051040006, Retrieved from the Internet: https://www.3gpp.org/ftp/tsg ran/WG1 RL1/TSGR1 83/Docs/.

Inerdigital: "Short TTI PUSCH Design", 3GPP Draft; RI-162966_SPUSCH, 3rd Generation Partnership Project (3GPP), Mobile Competence Centre ; 650, Route Des Lucioles ; F-06921 Sophia-Antipolis Cedex ;France vol. RAN WG1, no. Busan, Korea; Apr. 11, 2016-Apr. 15, 2016 Apr. 1, 2016 (Apr. 1, 2016), XP051079869, Retrieved from the Internet: URL:http://www.3gpp.org/ftp/tsg_ran/WG1_RL1/TSGR1_84b/Docs/.

Ericsson: "Overview of TTI shortening and reduced processing ime for DL tranmissions" 3GPP Draft; [LATRED] R1-160929_Overview_of_TTI-Shortening_and_Reduced_Time_for_DL_Transmissions, 3rd Generation Partnership Project (3GPP), Mobile Competence Centre ; 650, Route Des Luciole vol. RAN WG1, no. Malta; Feb. 15, 2016-Feb. 19, 2016 Feb. 14, 2016 (Feb. 14, 2016),XPO51053543, Retrieved from the Internet: https://www.3gpp.org/ftp/tsg_ran/WG1_RL1/TSGR1_84/Docs/.

European Search Report from corresponding EP Application No. 17170574.2, dated Dec. 12, 2017.

Huawei et al., R1-160292, Short TTI for DL transmissions, 3GPP TSG RAN WG1 #84, 3GPP, Server Publication Date (Feb. 6, 2016).

Huawei et al., R1-162115, Short TTI for UL transmissions, 3GPF TSG RAN WG1 #84bis, 3GPP, Server Publication Date (Apr. 2, 2016).

Office Action from Korean Intellectual Property Office in corresponding KR Application No. 10-2017-0058748, dated Aug. 13, 2018.

Huawei et al: "Short TTI for UL transmissions", 3GPP Draft; R1-162115, Apr. 2, 2016, XP051079962, Retrieved from the Internet: URL:http://www.3gpp.org/ftp/tsg_ran/WG1_RL1/TSGR1_84b/Docs/ [retrieved on Apr. 2, 2016].

Communication pursuant to Article 94(3) EPC from corresponding EP Application No. 17170574.2, dated Aug. 31, 2018.

3GPP R1-160292, "short TTI for DL transmissions", Feb. 19, 2016.

3GPP R1-162115, "short TTI for UL transmissions", Apr. 15, 2016.

Office Action from SIPO in corresponding SIPO Application No. 201710331398.0, dated Jun. 5, 2019.

Qualcomm Incorporated: "Processing time reduction and related procedures for DL", 3GFP Draft; R1-164460, May 14, 2016, XP051089973, Retrieved from the Internet: URL:http://www.3gpp.org/ftp/tsg_ran/WG1_RL1/TSGR1_85/Docs/ [retrieved on May 14, 2016].

Communication pursuant to Article 94(3) EPC received from corresponding EP Application No. 17170574.2, dated Apr. 1, 2019.

* cited by examiner

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

FIG. 5 (PRIOR ART)

| Normal cyclic prefix | | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

FIG. 6 (PRIOR ART)

| EPDCCH format | Number of ECCEs for one EPDCCH, $N_{ECCE}^{EPDCCH}$ | | | |
|---|---|---|---|---|
| | Case A | | Case B | |
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | - | 32 | - | 16 |

FIG. 7 (PRIOR ART)

| Type | Search space $S_k^{(L)}$ | | Number of PDCCH candidates $M^{(L)}$ |
|---|---|---|---|
| | Aggregation level $L$ | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

FIG. 8 (PRIOR ART)

| Search space $S_k^{(L)}$ | | | Number of PDCCH candidates $M^{(L)}$ in first slot | Number of PDCCH candidates $M^{(L)}$ in second slot |
|---|---|---|---|---|
| Type | Aggregation level $L$ | Size [in CCEs] | | |
| UE-specific | 1 | 6 | 6 | 6 |
| | 2 | 12 | 6 | 6 |
| | 4 | 8 | 2 | 2 |
| | 8 | 16 | 2 | 2 |

FIG. 9 (PRIOR ART)

| pdcch-candidateReductions | Value of $a$ |
|---|---|
| 0 | 0 |
| 1 | 0.33 |
| 2 | 0.66 |
| 3 | 1 |

FIG. 10 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

FIG. 11 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

FIG. 12 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

FIG. 13 (PRIOR ART)

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |

FIG. 14 (PRIOR ART)

| UE transmit antenna selection | Antenna selection mask $< x_{AS,0}, x_{AS,1}, ..., x_{AS,15} >$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

FIG. 16 (PRIOR ART)

| TDD UL/DL Configuration | subframe number $n$ | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 17a (PRIOR ART)

| TDD UL/DL Configuration | subframe number $n$ | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | | 3 | | 2 | | | 3 |
| 6 | 5 | 5 | | | | 6 | 6 | | | 8 |

FIG. 17b (PRIOR ART)

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

METHOD AND APPARATUS FOR IMPROVING UPLINK GRANTS IN A SHORTENED TRANSMISSION TIME INTERVAL (TTI) IN A WIRELESS COMMUNICATION SYSTEM

CROSS-REFERENCE TO RELATED APPLICATIONS

The present application claims the benefit of U.S. Provisional Patent Application Ser. No. 62/335,335, filed on May 12, 2016 and U.S. Provisional Patent Application Ser. No. 65/335,449, filed on May 12, 2016, the entire disclosures of which are incorporated herein in their entirety by reference.

FIELD

This disclosure generally relates to wireless communication networks, and more particularly, to a method and apparatus for improving uplink grants in a shortened TTI in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for performing uplink transmission in a wireless communication system. In one embodiment, the method includes the UE (User Equipment) monitors a plurality of occasions for a DL (Downlink) control channel within a DL data region within one subframe, wherein a first control channel in a first occasion corresponds to a first UL (Uplink) data channel with a first duration, and wherein a second control channel in a second occasion corresponds to a second UL (Uplink) data channel with a second duration.

BRIEF DESCRIPTION OF THE DRAWINGS

FIG. 5 is a reproduction of Table 6.7-1 of 3GPP TS 36.211 v13.1.0.

FIG. 6 is a reproduction of Table 6.8A.1-1 of 3GPP TS 36.211 v13.1.0.

FIG. 7 is a reproduction of Table 6.8A.1-2 of 3GPP TS 36.211 v13.1.0.

FIG. 8 is a reproduction of Table 9.1.1-1 of 3GPP TS 36.213 v13.1.1.

FIG. 9 is a reproduction of Table 9.1.1-1A of 3GPP TS 36.213 v13.1.1.

FIG. 10 is a reproduction of Table 9.1.1-1A of 3GPP TS 36.213 v13.1.1.

FIG. 11 is a reproduction of Table 7.1-1 of 3GPP TS 36.213 v13.1.1.

FIG. 12 is a reproduction of Table 7.1-2 of 3GPP TS 36.213 v13.1.1.

FIG. 13 is a reproduction of Table 7.1-3 of 3GPP TS 36.213 v13.1.1.

FIG. 14 is a reproduction of Table 7.1-5 of 3GPP TS 36.213 v13.1.1.

FIG. 16 is a reproduction of Table 5.3.3.2-1 of 3GPP TS 36.212 v13.1.0.

FIG. 17a is a reproduction of Table 8-2 of 3GPP TS 36.213 v13.1.0.

FIG. 17b is a reproduction of Table 8-2a of 3GPP TS 36.213 v13.1.0.

FIG. 18 is a reproduction of Table 9.1.2-1 of 3GPP TS 36.213 v13.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE", Ericsson, Huawei; TS 36.213 v13.1.1, "E-UTRA Physical layer procedures (Release 13)."; TS 36.211 V13.1.0, "Physical channels and modulation (Release 13)"; TS 36.212 V13.1.0, "E-UTRA Multiplexing and channel coding (Release 13)"; R1-163068, "DL channel design for shortened TTI", Qualcomm Incorporated; and R1-163322, "Downlink control signaling design for short TTI", Ericsson. The standards and documents listed above are hereby expressly incorporated by reference in their entirety.

Figure 1:
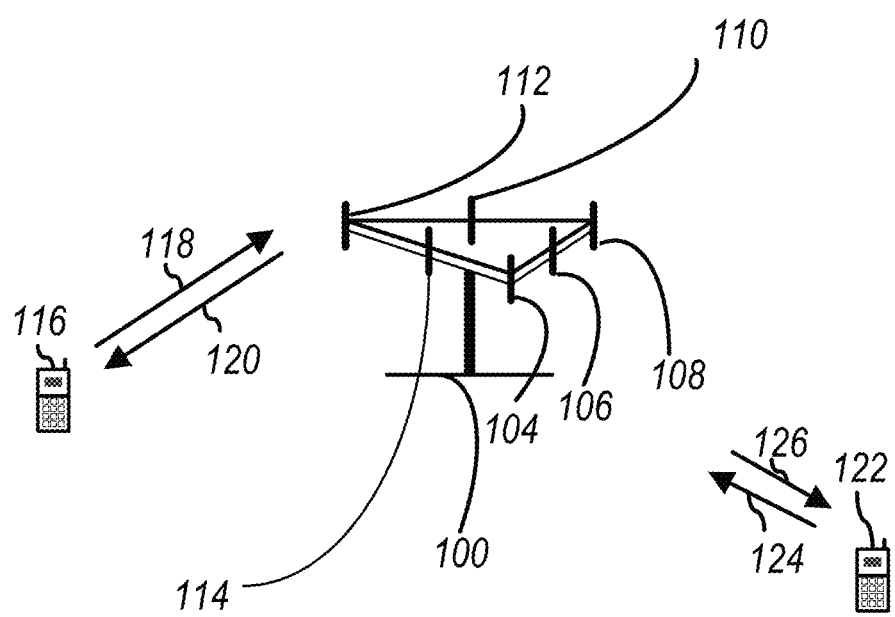
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
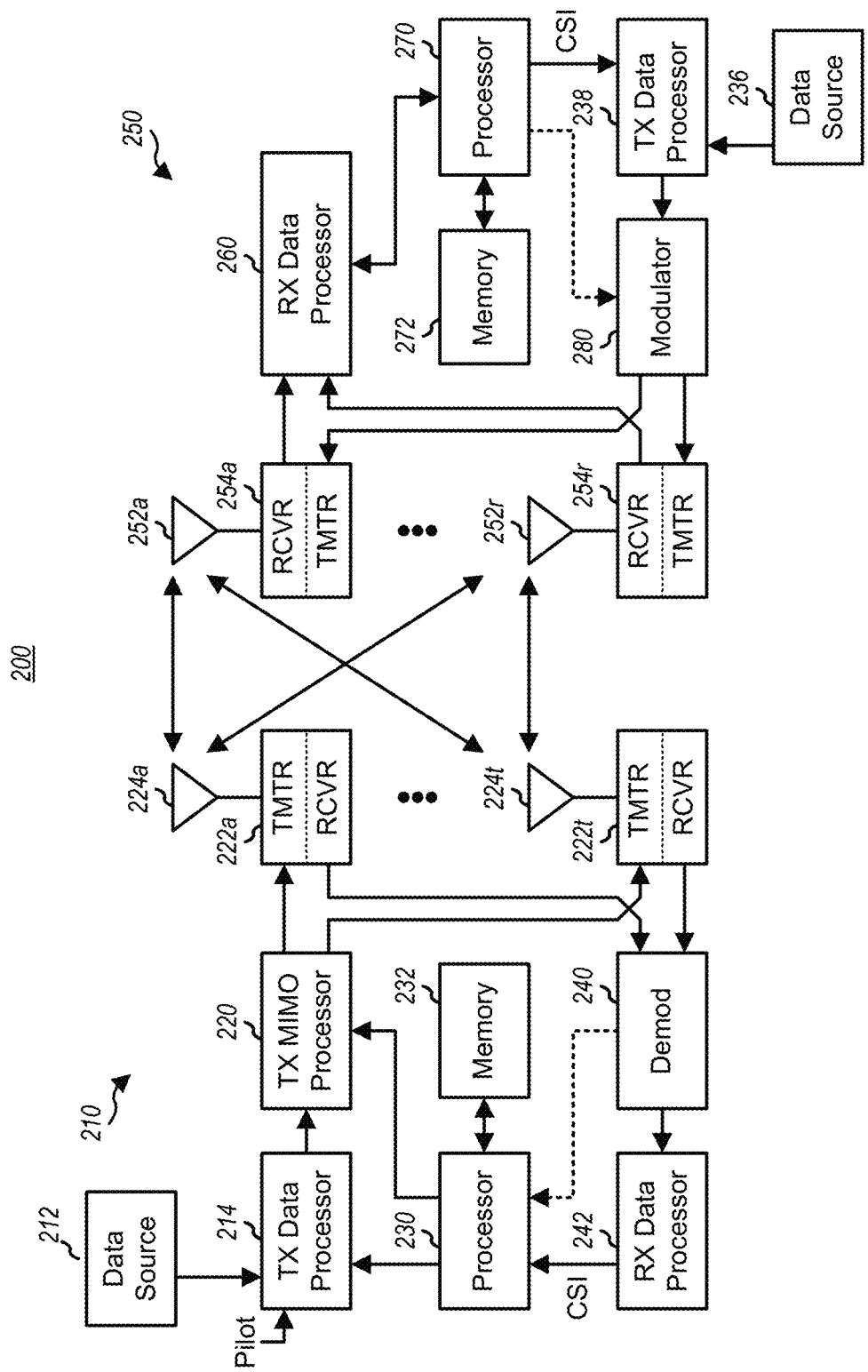
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
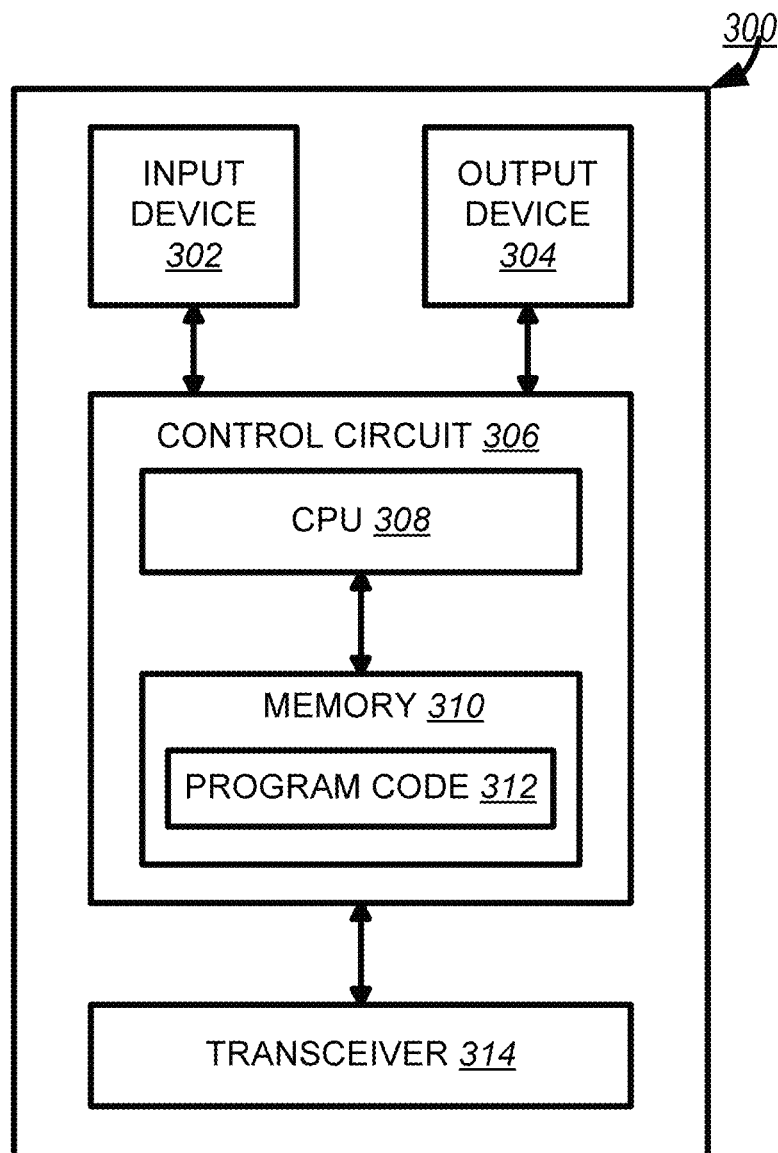
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
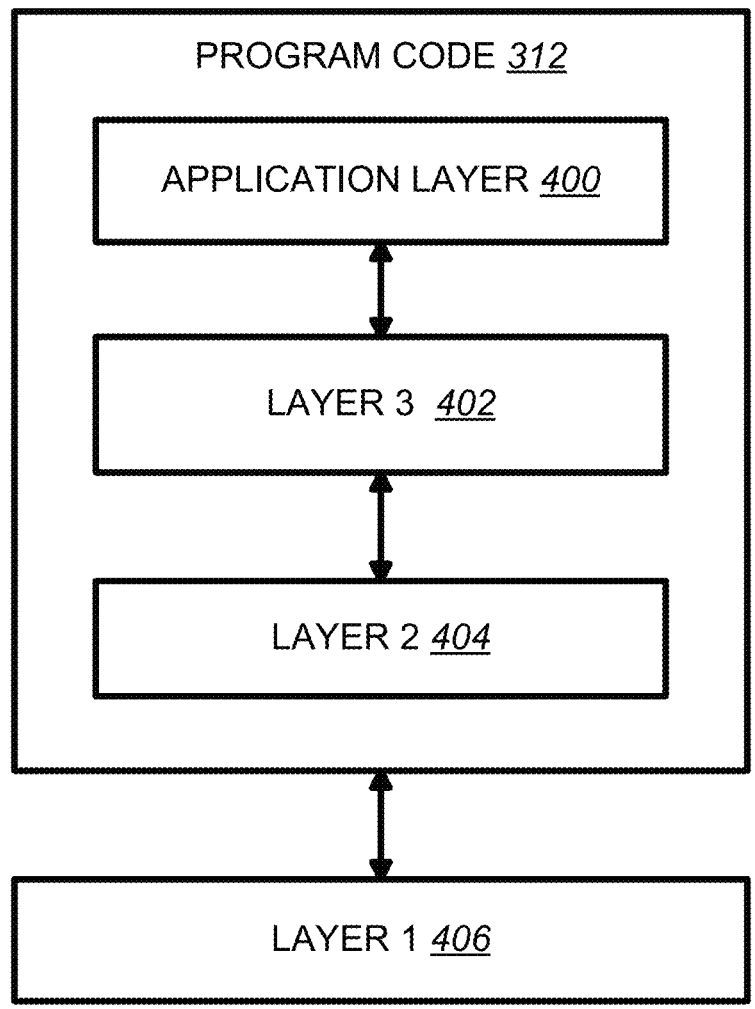
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item "Study on latency reduction techniques for LTE" generally aims to investigate and standardize some techniques of latency reduction.

According to 3GPP RP-150465, the objective of the study item is generally to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both FDD (Frequency Division Duplex) and TDD (Time Division Duplex) duplex modes are considered.

Packet data latency is one of the important metrics for performance evaluation. Reducing packet data latency improves the system performance. In 3GPP RP-150465, the study item "study on latency reduction techniques for LTE" generally aims to investigate and standardize some techniques of latency reduction.

According to 3GPP RP-150465, the objective of the study item is to study enhancements to the E-UTRAN (Evolved Universal Terrestrial Radio Access Network) radio system in order to significantly reduce the packet data latency over the LTE (Long Term Evolution) Uu air interface for an active UE (User Equipment) and significantly reduce the packet data transport round trip latency for UEs that have been inactive for a longer period (in connected state). The study area includes resource efficiency, including air interface capacity, battery lifetime, control channel resources, specification impact and technical feasibility. Both FDD (Frequency Division Duplex) and TDD (Time Division Duplex) duplex modes are considered.

According to RP-150465, two areas should be studies and documented:

Fast Uplink Access Solutions—For active UEs and UEs that have been inactive a longer time, but are kept in RRC (Radio Resource Control) Connected, focus should be on reducing user plane latency for the scheduled UL transmission and on getting a more resource efficient solution with protocol and signaling enhancements, compared to the pre-scheduling solutions allowed by the standard today, both with and without preserving the current TTI (Transmission Time Interval) length and processing times.

TTI Shortening and Reduced Processing Times—Assess specification impact and study feasibility and performance of TTI lengths between 0.5 ms and one OFDM (Orthogonal Frequency Division Multiplexing) symbol, taking into account impact on reference signals and physical layer control signaling.

TTI shortening and processing time reduction can be considered as an effective solution for reducing latency, as the time unit for transmission can be reduced, e.g., from 1 ms (14 OFDM) symbol to 1~7 OFDM symbols and the delay caused by decoding can be reduced as well. Another benefit of shortening TTI length is to support a finer granularity of transport block (TB) size, so that unnecessary padding could be reduced. On the other hand, reducing the length of TTI may also have significant impact to current system design as the physical channels are developed based on 1 ms structure. A shortened TTI is also called an sTTI.

For control channel, in LTE there are two types of control channel, one of them is Physical Downlink Control Channel (PDCCH), which is a wide band signal across whole system bandwidth and occupying the first several (e.g., 1~4) OFDM symbols of 1 ms subframe. The region occupied by PDCCH is usually named as control region, and the rest part of the subframe is usually known as data region. A second type of control channel, ePDCCH (Enhanced Physical Downlink Control Channel), occupies the data region in the time domain, while only part of the bandwidth in the frequency domain. A more detail description can be found in 3GPP TS 36.213 as follows:

9.1.3 Control Format Indicator (CFI) Assignment Procedure

PHICH duration is signalled by higher layers according to Table 6.9.3-1 in [3]. The duration signalled puts a lower limit on the size of the control region determined from the control format indicator (CFI). When $N_{RB}^{DL}>10$, if extended PHICH duration is indicated by higher layers then the UE shall assume that CFI is equal to PHICH duration.

In subframes indicated by higher layers to decode PMCH, when $N_{RB}^{DL}>10$, a UE may assume that CFI is equal to the value of the higher layer parameter non-MBSFNregion-Length [11].

Furthermore, 3GPP TS 36.211 states:

6.7 Physical Control Format Indicator Channel

The physical control format indicator channel carries information about the number of OFDM symbols used for transmission of PDCCHs in a subframe. The set of OFDM symbols possible to use for PDCCH in a subframe is given by Table 6.7-1.

[Table 6.7-1 of 3GPP TS 36.211 v13.1.0, Entitled "Number of OFDM Symbols Used for PDCCH", is Reproduced as FIG. 5]

The UE may assume the PCFICH is transmitted when the number of OFDM symbols for PDCCH is greater than zero unless stated otherwise in [4, clause 12].

3GPP TS 36.211 also states:

6.2.4 Resource-Element Groups

Resource-element groups are used for defining the mapping of control channels to resource elements.

A resource-element group is represented by the index pair (k',l') of the resource element with the lowest index k in the group with all resource elements in the group having the same value of l. The set of resource elements (k,l) in a resource-element group depends on the number of cell-specific reference signals configured as described below with $k_0 = n_{PRB} \cdot N_{sc}^{RB}$, $0 \leq n_{PRB} < N_{RB}^{DL}$.

- In the first OFDM symbol of the first slot in a subframe the two resource-element groups in physical resource block $n_{PRB}$ consist of resource elements (k,l=0) with $k=k_0+0, k_0+1, \ldots, k_0+5$ and $k=k_0+6, k_0+7, \ldots, k_0+11$, respectively.
- In the second OFDM symbol of the first slot in a subframe in case of one or two cell-specific reference signals configured, the three resource-element groups in physical resource block $n_{PRB}$ consist of resource elements (k,l=1) with $k=k_0+0, k_0+1, \ldots, k_0+3, k=k_0+4, k_0+5, \ldots, k_0+7$ and $k=k_0+8, k_0+9, \ldots, k_0+11$, respectively.
- In the second OFDM symbol of the first slot in a subframe in case of four cell-specific reference signals configured, the two resource-element groups in physical resource block $n_{PRB}$ consist of resource elements (k,l=1) with $k=k_0+0, k_0+1, \ldots, k_0+5$ and $k=k_0+6, k_0+7, \ldots, k_0+11$, respectively.
- In the third OFDM symbol of the first slot in a subframe, the three resource-element groups in physical resource block $n_{PRB}$ consist of resource elements (k,l=2) with $k=k_0+0, k_0+1, \ldots, k_0+3, k=k_0+4, k_0+5, \ldots, k_0+7$ and $k=k_0+8, k_0+9, \ldots, k_0+11$, respectively.
- In the fourth OFDM symbol of the first slot in a subframe in case of normal cyclic prefix, the three resource-element groups in physical resource block $n_{PRB}$ consist of resource elements (k,l=3) with $k=k_0+0, k_0+1, \ldots, k_0+3, k=k_0+4, k_0+5, \ldots, k_0+7$ and $k=k_0+8, k_0+9, \ldots, k_0+11$, respectively.
- In the fourth OFDM symbol of the first slot in a subframe in case of extended cyclic prefix, the two resource-element groups in physical resource block $n_{PRB}$ consist of resource elements (k,l=3) with $k=k_0+0, k_0+1, \ldots, k_0+5$ and $k=k_0+6, k_0+7, \ldots, k_0+11$, respectively.

Mapping of a symbol-quadruplet $\langle z(i), z(i+1), z(i+2), z(i+3) \rangle$ onto a resource-element group represented by resource-element (k',l') is defined such that elements z(i) are mapped to resource elements (k,l) of the resource-element group not used for cell-specific reference signals in increasing order of i and k. In case a single cell-specific reference signal is configured, cell-specific reference signals shall be assumed to be present on antenna ports 0 and 1 for the purpose of mapping a symbol-quadruplet to a resource-element group, otherwise the number of cell-specific reference signals shall be assumed equal to the actual number of antenna ports used for cell-specific reference signals. The UE shall not make any assumptions about resource elements assumed to be reserved for reference signals but not used for transmission of a reference signal.

For frame structure type 3, if the higher layer parameter subframeStartPosition indicates 's07' and the downlink transmission starts in the second slot of a subframe, the above definition applies to the second slot of that subframe instead of the first slot.

6.2.4A Enhanced Resource-Element Groups (EREGs)

EREGs are used for defining the mapping of enhanced control channels to resource elements. There are 16 EREGs, numbered from 0 to 15, per physical resource block pair. Number all resource elements, except resource elements carrying DM-RS for antenna ports p={107,108,109,110} for normal cyclic prefix or p={107,108} for extended cyclic prefix, in a physical resource-block pair cyclically from 0 to 15 in an increasing order of first frequency, then time. All resource elements with number i in that physical resource-block pair constitutes EREG number i.

For frame structure type 3, if the higher layer parameter subframeStartPosition indicates 's07' and the downlink transmission starts in the second slot of a subframe, the above definition applies to the second slot of that subframe instead of the first slot.

< . . . >

6.8A Enhanced Physical Downlink Control Channel 6.8A.1 EPDCCH Formats

The enhanced physical downlink control channel (EPDCCH) carries scheduling assignments. An enhanced physical downlink control channel is transmitted using an aggregation of one or several consecutive enhanced control channel elements (ECCEs) where each ECCE consists of multiple enhanced resource element groups (EREGs), defined in clause 6.2.4A. The number of ECCEs used for one EPDCCH depends on the EPDCCH format as given by Table 6.8A.1-2 and the number of EREGs per ECCE is given by Table 6.8A.1-1. Both localized and distributed transmission is supported.

An EPDCCH can use either localized or distributed transmission, differing in the mapping of ECCEs to EREGs and PRB pairs.

A UE shall monitor multiple EPDCCHs as defined in 3GPP TS 36.213 [4]. One or two sets of physical resource-block pairs which a UE shall monitor for EPDCCH transmissions can be configured. All EPDCCH candidates in EPDCCH set $X_m$ use either only localized or only distributed transmission as configured by higher layers. Within EPDCCH set $X_m$ in subframe i, the ECCEs available for transmission of EPDCCHs are numbered from 0 to $N_{ECCE,m,i}-1$ and ECCE number n corresponds to

- EREGs numbered $(n \bmod N_{ECCE}^{RB}) + jN_{ECCE}^{RB}$ in PRB index $\lfloor n/N_{ECCE}^{RB} \rfloor$ for localized mapping, and
- EREGs numbered $\lfloor n/N_{RB}^{X_m} \rfloor + jN_{ECCE}^{RB}$ in PRB indices $(n+j \max(1, N_{RB}^{X_m}/N_{EREG}^{ECCE})) \bmod N_{RB}^{X_m}$ for distributed mapping, where $j=0, 1, \ldots, N_{EREG}^{ECCE}-1$, $N_{EREG}^{ECCE}$ is the number of EREGs per ECCE, and $N_{ECCE}^{RB}=16/N_{EREG}^{ECCE}$ is the number of ECCEs per resource-block pair. The physical resource-block pairs constituting EPDCCH set $X_m$ are in this paragraph assumed to be numbered in ascending order from 0 to $N_{RB}^{X_m}-1$.

[Table 6.8A.1-1 of 3GPP TS 36.211 v13.1.0, Entitled "Number of EREGs Per ECCE, $N_{EREG}^{ECCE}$", is Reproduced as FIG. 6]

[Table 6.8A.1-2 of 3GPP TS 36.211 v13.1.0, Entitled "Supported EPDCCH Formats", is Reproduced as FIG. 7]

Case A in Table 6.8A.1-2 is used when the conditions corresponding to case 1 in clause 9.1.4 of 3GPP TS 36.213 [4] are satisfied, otherwise case B is used. The quantity $n_{EPDCCH}$ for a particular UE and referenced in 3GPP TS 36.213 [4] is defined as the number of downlink resource elements (k,l) available for EPDCCH transmission in a physical resource-block pair configured for possible EPDCCH transmission of EPDCCH set $X_0$ and fulfilling all of the following criteria:

they are part of any one of the 16 EREGs in the physical resource-block pair, and they are assumed by the UE not to be used for cell-specific reference signals, where the positions of the cell-specific reference signals are given by clause 6.10.1.2 with the number of antenna ports for and the frequency shift of cell-specific reference signals derived as described in clause 6.10.1.2 unless other values for these parameters are provided by clause 9.1.4.3 in 3GPP TS 36.213 [4], and— they are assumed by the UE not to be used for transmission of CSI reference signals, where the positions of the CSI reference signals are given by clause 6.10.5.2 with the configuration for zero power CSI reference signals obtained as described in clause 6.10.5.2 unless other values are provided by clause 9.1.4.3 in 3GPP TS 36.213 [4], and with the configuration for non-zero power CSI reference signals obtained as described in clause 6.10.5.2, and for frame structure type 1 and 2, the index l in the first slot in a subframe fulfils $l \geq l_{EPDCCHStart}$ where $l_{EPDCCHStart}$ is given by clause 9.1.4.1 of 3GPP TS 36.213 [4], and for frame structure type 3,
    if the higher layer parameter subframeStartPosition indicates 's07' and if the downlink transmission starts in the second slot of a subframe
      the index l in the second slot in the subframe fulfils $l \geq l_{EPDCCHStart}$ where $l_{EPDCCHStart}$ is given by clause 7.1.6.4 of 3GPP TS 36.213 [4],
    otherwise
      the index l in the first slot in the subframe fulfils $l \geq l_{EPDCCHStart}$ where $l_{EPDCCHStart}$ is given by clause 7.6.1.4 of 3GPP TS 36.213 [4].

Downlink control information (DCI) would be carried on control channel, e.g., PDCCH/ePDCCH. Downlink control information may be used to carry scheduling for downlink data or uplink data. Downlink control information may also be used carry special messages, e.g. triggering some procedure or control UE power, from eNB to the UE. Several different DCI formats exist to serve the above different purposes. Taking downlink data scheduling as an example, DCI for downlink data scheduling may comprise the resource allocation (in the frequency domain), modulation and coding scheme, redundancy version, HARQ (Hybrid Automatic Repeat Request) process ID, and other information require to perform the reception. More details can be found in 3GPP TS 36.212 V13.1.0 as follows:

5.3.3.1.5D Format 2D

The following information is transmitted by means of the DCI format 2D:

Carrier indicator—0 or 3 bits. The field is present according to the definitions in [3].
  Resource allocation header (resource allocation type 0/type 1)—1 bit as defined in section 7.1.6 of [3]
    If downlink bandwidth is less than or equal to 10 PRBs, there is no resource allocation header and resource allocation type 0 is assumed.
  Resource block assignment:
    For resource allocation type 0 as defined in section 7.1.6.1 of [3]
      $\lceil N_{RB}^{DL}/P \rceil$ bits provide the resource allocation
    For resource allocation type 1 as defined in section 7.1.6.2 of [3]
      $\lceil \log_2(P) \rceil$ bits of this field are used as a header specific to this resource allocation type to indicate the selected resource blocks subset
      1 bit indicates a shift of the resource allocation span
      ($\lceil N_{RB}^{DL}/P \rceil - \lceil \log_2(P) \rceil - 1$) bits provide the resource allocation
    where the value of P depends on the number of DL resource blocks as indicated in section [7.1.6.1] of [3]
  TPC command for PUCCH—2 bits as defined in section 5.1.2.1 of [3]
  Downlink Assignment Index—number of bits as specified in Table 5.3.3.1.2-2.
  HARQ process number—3 bits (for cases with FDD primary cell), 4 bits (for cases with TDD primary cell)
  Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of [2], or 4 bits as specified in Table 5.3.3.1.5C-2 where $n_{SCID}$ is the scrambling identity for antenna ports 7, 8, 11 and 13 defined in section 6.10.3.1 of [2] when higher layer parameter dmrs-tableAlt is set to 1.
  SRS request—[0-1] bit. This field can only be present for TDD operation and if present is defined in section 8.2 of [3]
  In addition, for transport block 1:
    Modulation and coding scheme—5 bits as defined in section 7.1.7 of [3]
    New data indicator—1 bit
    Redundancy version—2 bits
  In addition, for transport block 2:
    Modulation and coding scheme—5 bits as defined in section 7.1.7 of [3]
    New data indicator—1 bit
    Redundancy version—2 bits
  PDSCH RE Mapping and Quasi-Co-Location Indicator—2 bits as defined in sections 7.1.9 and 7.1.10 of [3]
  HARQ-ACK resource offset (this field is present when this format is carried by EPDCCH. This field is not present when this format is carried by PDCCH)—2 bits as defined in section 10.1 of [3]. The 2 bits are set to 0 when this format is carried by EPDCCH on a secondary cell, or when this format is carried by EPDCCH on the primary cell scheduling PDSCH on a secondary cell and the UE is configured with PUCCH format 3 for HARQ-ACK feedback.

If both transport blocks are enabled; transport block 1 is mapped to codeword 0; and transport block 2 is mapped to codeword 1.

In case one of the transport blocks is disabled; the transport block to codeword mapping is specified according to Table 5.3.3.1.5-2. For the single enabled codeword, Value=4, 5, 6 in Table 5.3.3.1.5C-1 are only supported for retransmission of the corresponding transport block if that transport block has previously been transmitted using two, three or four layers, respectively.

If the number of information bits in format 2D carried by PDCCH belongs to one of the sizes in Table 5.3.3.1.2-1, one zero bit shall be appended to format 2D.

Since different DCI formats may have different payload sizes and UE may need to acquire different DCI formats, UE need to decode several decoding candidates without knowing which or whether candidate exist. It is known as blind decoding. The resource of decoding candidate(s) is known as a search space of a UE. The search space is further partition to common search space and UE specific search space which may contain different type of messages. Within search space, UE may search for different DCI format. Also, within search space, UE would monitor control channel addressed different identifier, e.g., Radio Network Temporary Identifier (RNTI), which is done by descrambling CRC (Cyclic Redundancy Check) of a decoding candidate with different RNTI and check which one would pass the check. Related procedures are described in 3GPP TS 36.213 as follows:

9.1.1 PDCCH Assignment Procedure

The control region of each serving cell consists of a set of CCEs, numbered from 0 to $N_{CCE,k}-1$ according to subclause 6.8.1 in [3], where $N_{CCE,k}$ is the total number of CCEs in the control region of subframe k.

The UE shall monitor a set of PDCCH candidates on one or more activated serving cells as configured by higher layer signalling for control information, where monitoring implies attempting to decode each of the PDCCHs in the set according to all the monitored DCI formats.

A BL/CE UE is not required to monitor PDCCH.

The set of PDCCH candidates to monitor are defined in terms of search spaces, where a search space $S_k^{(L)}$ at aggregation level LE $\{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\bmod \lfloor N_{CCE,k}/L\rfloor\}+i$$

where $Y_k$ is defined below, i=0, ..., L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_u$ is the carrier indicator field value, else if the monitoring UE is not configured with carrier indicator field then m'=m, where m=0, ..., $M^{(L)}-1$. $M^{(L)}$ is the number of PDCCH candidates to monitor in the given search space.

If a UE is configured with higher layer parameter cif-InSchedulingCell-r13, the carrier indicator field value corresponds to cif-InSchedulingCell-r13, otherwise, the carrier indicator field value is the same as ServCellIndex given in [11].

The UE shall monitor one common search space in every non-DRX subframe at each of the aggregation levels 4 and 8 on the primary cell.

A UE shall monitor common search space on a cell to decode the PDCCHs necessary to receive MBMS on that cell when configured by higher layers.

If a UE is not configured for EPDCCH monitoring, and if the UE is not configured with a carrier indicator field, then the UE shall monitor one PDCCH UE-specific search space at each of the aggregation levels 1, 2, 4, 8 on each activated serving cell in every non-DRX subframe.

If a UE is not configured for EPDCCH monitoring, and if the UE is configured with a carrier indicator field, then the UE shall monitor one or more UE-specific search spaces at each of the aggregation levels 1, 2, 4, 8 on one or more activated serving cells as configured by higher layer signalling in every non-DRX subframe.

If a UE is configured for EPDCCH monitoring on a serving cell, and if that serving cell is activated, and if the UE is not configured with a carrier indicator field, then the UE shall monitor one PDCCH UE-specific search space at each of the aggregation levels 1, 2, 4, 8 on that serving cell in all non-DRX subframes where EPDCCH is not monitored on that serving cell.

If a UE is configured for EPDCCH monitoring on a serving cell, and if that serving cell is activated, and if the UE is configured with a carrier indicator field, then the UE shall monitor one or more PDCCH UE-specific search spaces at each of the aggregation levels 1, 2, 4, 8 on that serving cell as configured by higher layer signalling in all non-DRX subframes where EPDCCH is not monitored on that serving cell.

The common and PDCCH UE-specific search spaces on the primary cell may overlap.

A UE configured with the carrier indicator field associated with monitoring PDCCH on serving cell c shall monitor PDCCH configured with carrier indicator field and with CRC scrambled by C-RNTI in the PDCCH UE specific search space of serving cell c.

A UE configured with the carrier indicator field associated with monitoring PDCCH on the primary cell shall monitor PDCCH configured with carrier indicator field and with CRC scrambled by SPS C-RNTI in the PDCCH UE specific search space of the primary cell.

The UE shall monitor the common search space for PDCCH without carrier indicator field.

For the serving cell on which PDCCH is monitored, if the UE is not configured with a carrier indicator field, it shall monitor the PDCCH UE specific search space for PDCCH without carrier indicator field, if the UE is configured with a carrier indicator field it shall monitor the PDCCH UE specific search space for PDCCH with carrier indicator field.

If the UE is not configured with a LAA Scell, the UE is not expected to monitor the PDCCH of a secondary cell if it is configured to monitor PDCCH with carrier indicator field corresponding to that secondary cell in another serving cell.

If the UE is configured with a LAA Scell, the UE is not expected to monitor the PDCCH UE specific space of the LAA SCell if it is configured to monitor PDCCH with carrier indicator field corresponding to that LAA Scell in another serving cell,
  where the UE is not expected to be configured to monitor PDCCH with carrier indicator field in an LAA Scell;
  where the UE is not expected to be scheduled with PDSCH starting in the second slot in a subframe in an LAA Scell if the UE is configured to monitor PDCCH with carrier indicator field corresponding to that LAA Scell in another serving cell.

For the serving cell on which PDCCH is monitored, the UE shall monitor PDCCH candidates at least for the same serving cell.

A UE configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in [4] in the
  common search space
  PDCCH UE specific search space
  on the primary cell shall assume that for the PDCCH candidates with CRC scrambled by C-RNTI or SPS C-RNTI,
    if the UE is configured with the carrier indicator field associated with monitoring the PDCCH on the primary cell, only the PDCCH in the common search space is transmitted by the primary cell;
    otherwise, only the PDCCH in the UE specific search space is transmitted by the primary cell.

A UE configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size may be transmitted in the given serving cell in any PDCCH UE specific search space corresponding to any of the possible values of CIF for the given DCI format size.

If a serving cell is a LAA Scell, and if the higher layer parameter subframeStartPosition for the Scell indicates 's07', The UE monitors PDCCH UE-specific search space candidates on the Scell in both the first and second slots of a subframe, and the aggregation levels defining the search spaces are listed in Table 9.1.1-1A;

otherwise,

The aggregation levels defining the search spaces are listed in Table 9.1.1-1.

If a serving cell is a LAA Scell, the UE may receive PDCCH with DCI CRC scrambled by CC-RNTI as described in subclause 13A on the LAA Scell.

The DCI formats that the UE shall monitor depend on the configured transmission mode per each serving cell as defined in subclause 7.1.

If a UE is configured with higher layer parameter skipMonitoringDCI-format0-1A for a serving cell, the UE is not required to monitor the PDCCH with DCI Format 0/1A in the UE specific search space for that serving cell.

If a UE is configured with higher layer parameter pdcch-candidateReductions for a UE specific search space at aggregation level L for a serving cell, the corresponding number of PDCCH candidates is given by $M^{(L)}$=round(a× $M_{full}^{(L)}$), where the value of a is determined according to Table 9.1.1-2 and $M_{full}^{(L)}$ is determined according to Table 9.1.1-1 by replacing $M^{(L)}$ with $M_{full}^{(L)}$.

[Table 9.1.1-1 of 3GPP TS 36.213 v13.1.1, Entitled "PDCCH Candidates Monitored by a UE", is Reproduced as FIG. 8]

[Table 9.1.1-1A of 3GPP TS 36.213 v13.1.1, Entitled "PDCCH UE-Specific Search Space Candidates Monitored by a UE on LAA Scell", is Reproduced as FIG. 9]

[Table 9.1.1-1A of 3GPP TS 36.213 v13.1.1, Entitled "Scaling Factor for PDCCH Candidates Reduction", is Reproduced as FIG. 10]

For the common search spaces, $Y_k$ is set to 0 for the two aggregation levels L=4 and L=8. For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \ne 0$, A=39827, D=65537 and k=$\lfloor n_s/2 \rfloor$, $n_s$ is the slot number within a radio frame.

The RNTI value used for $n_{RNTI}$ is defined in subclause 7.1 in downlink and subclause 8 in uplink.

[ . . . ]

9.1.4 EPDCCH Assignment Procedure

For each serving cell, higher layer signalling can configure a UE with one or two EPDCCH-PRB-sets for EPDCCH monitoring. The PRB-pairs corresponding to an EPDCCH-PRB-set are indicated by higher layers as described in subclause 9.1.4.4. Each EPDCCH-PRB-set consists of set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signalling for control information, where monitoring implies attempting to decode each of the EPDCCHs in the set according to the monitored DCI formats.

A BL/CE UE is not required to monitor EPDCCH.

The set of EPDCCH candidates to monitor are defined in terms of EPDCCH UE-specific search spaces.

For each serving cell, the subframes in which the UE monitors EPDCCH UE-specific search spaces are configured by higher layers.

The UE shall not monitor EPDCCH

For TDD and normal downlink CP, in special subframes for the special subframe configurations 0 and 5 shown in Table 4.2-1 of [3].

For TDD and extended downlink CP, in special subframes for the special subframe configurations 0, 4 and 7 shown in Table 4.2-1 of [3].

In subframes indicated by higher layers to decode PMCH.

For TDD and if the UE is configured with different UL/DL configurations for the primary and a secondary cell, in a downlink subframe on the secondary cell when the same subframe on the primary cell is a special subframe and the UE is not capable of simultaneous reception and transmission on the primary and secondary cells.

An EPDCCH UE-specific search space $ES_k^{(L)}$ at aggregation level $L \in \{1,2,4,8,16,32\}$ is defined by a set of EPDCCH candidates.

For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i$$

where $Y_{p,k}$ is defined below, i=0, . . . , L−1 b=$n_{CI}$ if the UE is configured with a carrier indicator field for the serving cell on which EPDCCH is monitored, otherwise b=0

$n_{CI}$ is the carrier indicator field value, m=0, 1, . . . $M_p^{(L)}$−1,

If the UE is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b below; otherwise, $M_p^{(L)}$ is the number of EPDCCH candidates to monitor at aggregation level L in EPDCCH-PRB-set p for the serving cell indicated by $n_{CI}$.

If a UE is configured with higher layer parameter pdcch-candidateReductions for a specific search space at aggregation level L in EPDCCH-PRB-set p for a serving cell, the corresponding number of EPDCCH candidates is given by $M_p^{(L)}$=round(a× $M_{p,full}^{(L)}$), where the value of a is determined according to Table 9.1.1-2 and $M_{p,full}^{(L)}$ is determined according to Tables 9.1.4-1a to 9.1.4-5b by replacing $M_p^{(L)}$ with $M_{p,full}^{(L)}$.

If a UE is configured with higher layer parameter cifInSchedulingCell-r13, the carrier indicator field value corresponds to cif-InSchedulingCell-r13, otherwise the carrier indicator field value is the same as ServCellIndex given in [11].

A UE is not expected to monitor an EPDCCH candidate, if an ECCE corresponding to that EPDCCH candidate is mapped to a PRB pair that overlaps in frequency with a transmission of either PBCH or primary or secondary synchronization signals in the same subframe.

If a UE is configured with two EPDCCH-PRB-sets with the same $n_{ID,i}^{EPDCCH}$ value (where $n_{ID,i}^{EPDCCH}$ is defined in subclause 6.10.3A.1 in [3]), if the UE receives an EPDCCH candidate with a given DCI payload size corresponding to one of the EPDCCH-PRB-sets and mapped only to a given set of REs (as described in subclause 6.8A.5 in [3]), and if the UE is also configured to monitor an EPDCCH candidate with the same DCI payload size and corresponding to the other EPDCCH-PRB-set and which is mapped only to the same set of REs, and if the number of the first ECCE of the received EPDCCH candidate is used for determining PUCCH resource for HARQ-ACK transmission (as described in subclause 10.1.2 and subclause 10.1.3), the number of the first ECCE shall be determined based on EPDCCH-PRB-set p=0.

The variable $Y_{p,k}$ is defined by $$Y_{p,k}=(A_p \cdot Y_{p,k-1}) \bmod D$$

where $Y_{p,-1}=n_{RNTI} \neq 0$, $A_0=39827$, $A_1=39829$, $D=65537$ and $k=\lfloor n_s/2 \rfloor$, $n_s$ is the slot number within a radio frame. The RNTI value used for $n_{RNTI}$ is defined in subclause 7.1 in downlink and subclause 8 in uplink. The DCI formats that the UE shall monitor depend on the configured transmission mode per each serving cell as defined in subclause 7.1.

If a UE is configured with higher layer parameter skipMonitoringDCI-format0-1A for a serving cell, the UE is not required to monitor the EPDCCH with DCI Format 0/1A in the UE specific search space for that serving cell.

If a serving cell is a LAA Scell, and if the higher layer parameter subframeStartPosition for the Scell indicates 's07'
   the UE monitors EPDCCH UE-specific search space candidates on the Scell assuming they start in both the first slot and the second slot of a subframe.

The aggregation levels defining the search spaces and the number of monitored EPDCCH candidates is given as follows
   For a UE configured with only one EPDCCH-PRB-set for distributed transmission, the aggregation levels defining the search spaces and the number of monitored EPDCCH candidates are listed in Table 9.1.4-1a, Table 9.1.4-1b.
   For a UE configured with only one EPDCCH-PRB-set for localized transmission, the aggregation levels defining the search spaces and the number of monitored EPDCCH candidates are listed in Table 9.1.4-2a, Table 9.1.4-2b.
   For a UE configured with two EPDCCH-PRB-sets for distributed transmission, the aggregation levels defining the search spaces and the number of monitored EPDCCH candidates are listed in Table 9.1.4-3a, 9.1.4-3b.
   For a UE configured with two EPDCCH-PRB-sets for localized transmission, the aggregation levels defining the search spaces and the number of monitored EPDCCH candidates are listed in Table 9.1.4-4a, 9.4.4-4b.
   For a UE configured with one EPDCCH-PRB-set for distributed transmission, and one EPDCCH-PRB-set for localized transmission, the aggregation levels defining the search spaces and the number of monitored EPDCCH candidates are listed in Table 9.1.4-5a, 9.1.4-5b.

If the UE is not configured with a carrier indicator field for the serving cell on which EPDCCH is monitored, $\hat{N}_{RB}^{DL}=N_{RB}^{DL}$ of the serving cell on which EPDCCH is monitored. If the UE is configured with a carrier indicator field for the serving cell on which EPDCCH is monitored, $\hat{N}_{RB}^{DL}=N_{RB}^{DL}$ of the serving cell indicated by $n_{CI}$.

3GPP TS 36.213 V13.1.1 also states:
7.1 UE Procedure for Receiving the Physical Downlink Shared Channel Except the subframes indicated by the higher layer parameter mbsfn-SubframeConfigList or by mbsfn-SubframeConfigList-v12x0 or by laa-SCellSubframeConfig of serving cell c, a UE shall
   upon detection of a PDCCH of the serving cell with DCI format 1, 1A, 1B, 1C, 1D, 2, 2A, 2B, 2C, or 2D intended for the UE in a subframe, or
   upon detection of an EPDCCH of the serving cell with DCI format 1, 1A, 1B, 1D, 2, 2A, 2B, 2C, or 2D intended for the UE in a subframe
   decode the corresponding PDSCH in the same subframe with the restriction of the number of transport blocks defined in the higher layers.
   [ . . . ]
   If a UE is configured by higher layers to decode PDCCH with CRC scrambled by the SI-RNTI, the UE shall decode the PDCCH and the corresponding PDSCH according to any of the combinations defined in Table 7.1-1. The scrambling initialization of PDSCH corresponding to these PDCCHs is by SI-RNTI.

[Table 7.1-1 of 3GPP TS 36.213 v13.1.1, Entitled "PDCCH and PDSCH Configured by SI-RNTI", is Reproduced as FIG. 11]

If a UE is configured by higher layers to decode PDCCH with CRC scrambled by the P-RNTI, the UE shall decode the PDCCH and the corresponding PDSCH according to any of the combinations defined in Table 7.1-2.

The scrambling initialization of PDSCH corresponding to these PDCCHs is by P-RNTI.

If a UE is configured by higher layers to decode MPDCCH with CRC scrambled by the P-RNTI, the UE shall decode the MPDCCH and any corresponding PDSCH according to any of the combinations defined in Table 7.1-2A.

The scrambling initialization of PDSCH corresponding to these MPDCCHs is by P-RNTI.

The UE is not required to monitor PDCCH with CRC scrambled by the P-RNTI on the PSCell.

[Table 7.1-2 of 3GPP TS 36.213 v13.1.1, Entitled "PDCCH and PDSCH Configured by P-RNTI", is Reproduced as FIG. 12]

[ . . . ]
   If a UE is configured by higher layers to decode PDCCH with CRC scrambled by the RA-RNTI, the UE shall decode the PDCCH and the corresponding PDSCH according to any of the combinations defined in Table 7.1-3. The scrambling initialization of PDSCH corresponding to these PDCCHs is by RA-RNTI.

If a UE is configured by higher layers to decode MPDCCH with CRC scrambled by the RA-RNTI, the UE shall decode the MPDCCH and the corresponding PDSCH according to any of the combinations defined in Table 7.1-3A. The scrambling initialization of PDSCH corresponding to these MPDCCHs is by RA-RNTI.

When RA-RNTI and either C-RNTI or SPS C-RNTI are assigned in the same subframe, the UE is not required to decode a PDSCH on the primary cell indicated by a PDCCH/EPDCCH with a CRC scrambled by C-RNTI or SPS C-RNTI.

[Table 7.1-3 of 3GPP TS 36.213 v13.1.1, Entitled "PDCCH and PDSCH Configured by RA-RNTI", is Reproduced as FIG. 13]

[ . . . ]

The UE is semi-statically configured via higher layer signalling to receive PDSCH data transmissions signalled via PDCCH/EPDCCH according to one of the transmission modes, denoted mode 1 to mode 10.

[ . . . ]

If a UE is configured by higher layers to decode PDCCH with CRC scrambled by the C-RNTI, the UE shall decode the PDCCH and any corresponding PDSCH according to the respective combinations defined in Table 7.1-5. The scrambling initialization of PDSCH corresponding to these PDCCHs is by C-RNTI.

If a UE is configured by higher layers to decode EPDCCH with CRC scrambled by the C-RNTI, the UE shall decode the EPDCCH and any corresponding PDSCH according to the respective combinations defined in Table 7.1-5A. The scrambling initialization of PDSCH corresponding to these EPDCCHs is by C-RNTI.

[ . . . ]

When a UE is configured in transmission mode 9 or 10, in the downlink subframes indicated by the higher layer parameter mbsfn-SubframeConfigList or by mbsfn-SubframeConfigList-v12x0 or by laa-SCellSubframeConfig of serving cell c except in subframes for the serving cell
  indicated by higher layers to decode PMCH or,
  configured by higher layers to be part of a positioning reference signal occasion and the positioning reference signal occasion is only configured within MBSFN subframes and the cyclic prefix length used in subframe #0 is normal cyclic prefix,
  the UE shall upon detection of a PDCCH with CRC scrambled by the C-RNTI with DCI format 1A/2C/2D intended for the UE or, upon detection of an EPDCCH with CRC scrambled by the C-RNTI with DCI format 1A/2C/2D intended for the UE, decode the corresponding PDSCH in the same subframe.

[ . . . ]

[Table 7.1-5 of 3GPP TS 36.213 v13.1.1, Entitled "PDCCH and PDSCH Configured by C-RNTI", is Reproduced as FIG. 14]

Furthermore, 3GPP TS 36.212 states:

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

Figure 5.3.3-1 shows the processing structure for one DCI. The following coding steps can be identified:
  Information element multiplexing
  CRC attachment
  Channel coding
  Rate matching The coding steps for DCI are shown in the figure below.

Figure 15:
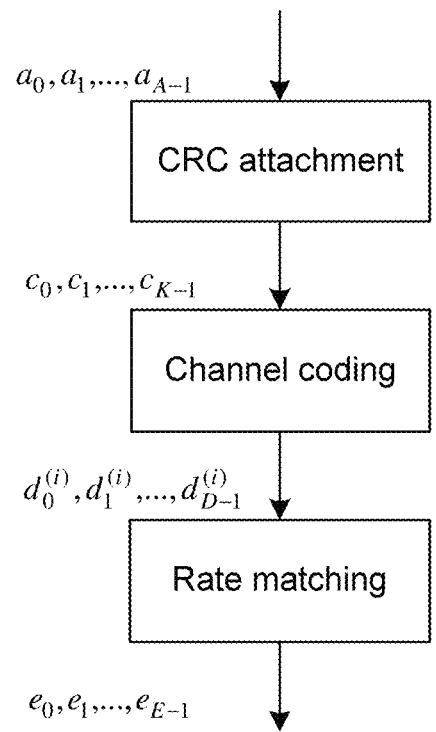
FIG. 15 is a reproduction of Figure 5.3.3-1 of 3GPP TS 36.212 v13.1.0.

[Figure 5.3.3-1 of 3GPP TS 36.212 v13.1.0, Entitled "Processing for One DCL", is Reproduced as FIG. 15]

[ . . . ]

5.3.3.2 CRC Attachment

Error detection is provided on DCI transmissions through a Cyclic Redundancy Check (CRC).

The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$. A is the payload size and L is the number of parity bits.

The parity bits are computed and attached according to section 5.1.1 setting L to 16 bits, resulting in the sequence $b_0, b_1, b_2, b_3, \ldots, b_{B-1}$, where B=A+L.

In the case where closed-loop UE transmit antenna selection is not configured or applicable, after attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{B-1}$. The relation between $c_k$ and $b_k$ is:

$c_k = b_k$ for $k=0,1,2,\ldots,A-1$ $c_k = (b_k + x_{rnti,k-A}) \bmod 2$ for $k=A, A+1, A+2, \ldots, A+15$.

In the case where closed-loop UE transmit antenna selection is configured and applicable, after attachment, the CRC parity bits with DCI format 0 are scrambled with the antenna selection mask $x_{AS,0}, x_{AS,1}, \ldots, x_{AS,15}$ as indicated in Table 5.3.3.2-1 and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$c_k = b_k$ for $k=0,1,2,\ldots,A-1$ $c_k = (b_k + x_{rnti,k-A} + x_{AS,k-A}) \bmod 2$ for $k=A, A+1, A+2, \ldots, A+15$.

[Table 5.3.3.2-1 of 3GPP TS 36.212 v13.1.0, Entitled "UE Transmit Antenna Selection Mask", is Reproduced as FIG. 16]

The timing relationship between control channel and data channel is specified in LTE. When UE receives a control channel in a subframe n for scheduling downlink data, the associated downlink data would be located in the data region of the same subframe n. And it would transmit corresponding HARQ feedback in a specific subframe after the reception, e.g., in subframe n+4. For the downlink data reception, asynchronous HARQ is applied, i.e., the retransmission timing is not tied to the feedback timing. Therefore, HARQ process ID would be required for the DL data scheduling. For the UL data scheduling, when UE receives a control channel in a subframe n for scheduling uplink data, the associated downlink data would be located in subframe n+4. For UL data, there is no control region as the control/data are multiplexed in frequency domain and UL data can occupy all symbols in a subframe within the allocated resource, except for those may be occupied by reference signal (RS). And it would expect corresponding HARQ feedback or a retransmission grant in a specific subframe after the reception, e.g. in subframe n+4. For the uplink data transmission, synchronous HARQ is applied, i.e. the retransmission timing is tied to the feedback timing. Therefore, HARQ process ID is not required for the UL data scheduling.

Additional detail regarding timing is described in 3GPP TS 36.213 as follows:

7.1 UE Procedure for Receiving the Physical Downlink Shared Channel

Except the subframes indicated by the higher layer parameter mbsfn-SubframeConfigList or by mbsfn-SubframeConfigList-v12x0 or by laa-SCellSubframeConfig of serving cell c, a UE shall
  upon detection of a PDCCH of the serving cell with DCI format 1, 1A, 1B, 1C, 1D, 2, 2A, 2B, 2C, or 2D intended for the UE in a subframe, or upon detection of an EPDCCH of the serving cell with DCI format 1, 1A, 1B, 1D, 2, 2A, 2B, 2C, or 2D intended for the UE in a subframe decode the corresponding PDSCH in the same subframe with the restriction of the number of transport blocks defined in the higher layers.

[ . . . ]

8.0 UE Procedure for Transmitting the Physical Uplink Shared Channel

The term "UL/DL configuration" in this subclause refers to the higher layer parameter subframeAssignment unless specified otherwise.

For FDD and normal HARQ operation, the UE shall upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information.

For FDD-TDD and normal HARQ operation and a PUSCH for serving cell c with frame structure type 1, the UE shall upon detection of a PDCCH/EPDCCH with DCI format 0/4 and/or a PHICH transmission in subframe n intended for the UE, adjust the corresponding PUSCH transmission for serving cell c in subframe n+4 according to the PDCCH/EPDCCH and PHICH information.

[ . . . ]

For TDD UL/DL configurations 1-6 and normal HARQ operation, the UE shall upon detection of a PDCCH/EPDCCH with uplink DCI format and/or a PHICH transmission in subframe n intended for the UE, adjust the corresponding PUSCH transmission in subframe n+k, with k given in Table 8-2, according to the PDCCH/EPDCCH and PHICH information.

For TDD UL/DL configuration 0 and normal HARQ operation the UE shall upon detection of a PDCCH/EPDCCH with uplink DCI format and/or a PHICH transmission in subframe n intended for the UE, adjust the corresponding PUSCH transmission in subframe n+k if the MSB of the UL index in the PDCCH/EPDCCH with uplink DCI format is set to 1 or PHICH is received in subframe n=0 or 5 in the resource corresponding to $I_{PHICH}$=0, as defined in subclause 9.1.2, with k given in Table 8-2. If, for TDD UL/DL configuration 0 and normal HARQ operation, the LSB of the UL index in the DCI format 0/4 is set to 1 in subframe n or a PHICH is received in subframe n=0 or 5 in the resource corresponding to $I_{PHICH}$=1, as defined in subclause 9.1.2, or PHICH is received in subframe n=1 or 6, the UE shall adjust the corresponding PUSCH transmission in subframe n+7. If, for TDD UL/DL configuration 0, both the MSB and LSB of the UL index in the PDCCH/EPDCCH with uplink DCI format are set in subframe n, the UE shall adjust the corresponding PUSCH transmission in both subframes n+k and n+7, with k given in Table 8-2.

For TDD UL/DL configurations 1 and 6 and subframe bundling operation, the UE shall upon detection of a PDCCH/EPDCCH with DCI format 0 in subframe n intended for the UE, and/or a PHICH transmission intended for the UE in subframe n−l with l given in Table 8-2a, adjust the corresponding first PUSCH transmission in the bundle in subframe n+k, with k given in Table 8-2, according to the PDCCH/EPDCCH and PHICH information.

For TDD UL/DL configuration 0 and subframe bundling operation, the UE shall upon detection of a PDCCH/EPDCCH with DCI format 0 in subframe n intended for the UE, and/or a PHICH transmission intended for the UE in subframe n−l with l given in Table 8-2a, adjust the corresponding first PUSCH transmission in the bundle in subframe n+k, if the MSB of the UL index in the DCI format 0 is set to 1 or if $I_{PHICH}$=0, as defined in subclause 9.1.2, with k given in Table 8-2, according to the PDCCH/EPDCCH and PHICH information. If, for TDD UL/DL configuration 0 and subframe bundling operation, the LSB of the UL index in the PDCCH/EPDCCH with DCI format 0 is set to 1 in subframe nor if $I_{PHICH}$=1, as defined in subclause 9.1.2, the UE shall adjust the corresponding first PUSCH transmission in the bundle in subframe n+7, according to the PDCCH/EPDCCH and PHICH information.

[Table 8-2 of 3GPP TS 36.213 v13.1.0, Entitled "k for TDD Configurations 0-6", is Reproduced as FIG. 17*a*]

[Table 8-2a of 3GPP TS 36.213 v13.1.0, Entitled "l for TDD Configurations 0, 1 and 6", is Reproduced as FIG. 17*b*]

[ . . . ]

9.1.2 PHICH Assignment Procedure

If a UE is not configured with multiple TAGs, or if a UE is configured with multiple TAGs and PUSCH transmissions scheduled from serving cell c in subframe n are not scheduled by a Random Access Response Grant corresponding to a random access preamble transmission for a secondary cell For PUSCH transmissions scheduled from serving cell c in subframe n, the UE shall determine the corresponding PHICH resource of serving cell c in subframe n+$k_{PHICH}$, where $k_{PHICH}$ is always 4 for FDD.

$k_{PHICH}$ is 6 for FDD-TDD and serving cell c frame structure type 2 and the PUSCH transmission is for another serving cell with frame structure type 1.

$k_{PHICH}$ is 4 for FDD-TDD and serving cell c frame structure type l and the PUSCH transmission is for a serving cell with frame structure type 1.

$k_{PHICH}$ is given in table 9.1.2-1 for FDD-TDD and serving cell c frame structure type 1 and the PUSCH transmission is for another serving cell with frame structure type 2.

For TDD, if the UE is not configured with EIMTA-MainConfigServCell-r12 for any serving cell and, if the UE is configured with one serving cell, or if the UE is configured with more than one serving cell and the TDD UL/DL configuration of all the configured serving cells is the same, for PUSCH transmissions scheduled from serving cell c in subframe n, the UE shall determine the corresponding PHICH resource of serving cell c in subframe n+$k_{PHICH}$, where $k_{PHICH}$ is given in table 9.1.2-1.

For TDD, if the UE is configured with more than one serving cell and the TDD UL/DL configuration of at least two configured serving cells is not the same, or if the UE is configured with EIMTA-MainConfigServCell-r12 for at least one serving cell, or for FDD-TDD and serving cell c frame structure type 2, for PUSCH transmissions scheduled from serving cell c in subframe n, the UE shall determine the corresponding PHICH resource of serving cell c in subframe n+$k_{PHICH}$, where $k_{PHICH}$ is given in table 9.1.2-1, where the "TDD UL/DL Configuration" in the rest of this subclause refers to the UL-reference UL/DL configuration (defined in subclause 8.0) of the serving cell corresponding to the PUSCH transmission.

[ . . . ]

[Table 9.1.2-1 of 3GPP TS 36.213 v13.1.0, Entitled a "$k_{PHICH}$ for TDD", is Reproduced as FIG. 18]

[ . . . ]

10.2 Uplink HARQ-ACK Timing

For TDD or for FDD-TDD and primary cell frame structure type 2 or for FDD-TDD and primary cell frame structure type 1, if a UE configured with EIMTA-MainConfig-ServCell-r12 for a serving cell, "UL/DL configuration" of the serving cell in subclause 10.2 refers to the UL/DL configuration given by the parameter eimta-HARQ-ReferenceConfig-r12 for the serving cell unless specified otherwise.

For a non-BL/CE UE, for FDD or for FDD-TDD and primary cell frame structure type 1, the UE shall upon detection of a PDSCH transmission in subframe n−4 intended for the UE and for which an HARQ-ACK shall be provided, transmit the HARQ-ACK response in subframe n. If HARQ-ACK repetition is enabled, upon detection of a PDSCH transmission in subframe n−4 intended for the UE and for which HARQ-ACK response shall be provided, and if the UE is not repeating the transmission of any HARQ-ACK in subframe n corresponding to a PDSCH transmission in subframes $n-N_{ANRep}-3, \ldots, n-5$, the UE:

- shall transmit only the HARQ-ACK response (corresponding to the detected PDSCH transmission in subframe n−4) on PUCCH in subframes n, n+1, ..., $n+N_{ANRep}-1$;
- shall not transmit any other signal/channel in subframes n, n+1, ..., $n+N_{ANRep}-1$; and
- shall not transmit any HARQ-ACK response repetitions corresponding to any detected PDSCH transmission in subframes $n-3, \ldots, n+N_{ANRep}-5$.

Furthermore, it is agreed for 3GPP to study a new type of control signal, sPDCCH to accommodate the new TTI length as follows:

Agreement:
  sPDCCH (PDCCH for short TTI) needs to be introduced for short TTI.
    Each short TTI on DL may contain sPDCCH decoding candidates
Conclusions:
  A maximum number of BDs will be defined for sPDCCH in USS
    In case 2-level DCI is adopted, any DCI for sTTI scheduling carried on PDCCH may be taken into account in the maximum total number of BDs
    FFS whether the maximum number is dependent on the sTTI length
    FFS whether the maximum number of blind decodes for (E)PDCCH is reduced in subframes in which the UE is expected to perform blind decodes for sPDCCH
    FFS whether a UE may be expected to monitor both EPDCCH and sPDCCH in the same subframe
    FFS whether the maximum number of BDs on PDCCH is changed from the legacy number if DCI on PDCCH is for sTTI scheduling Besides the timing domain structure, a two-level DCI structure is studied due to the increase of control overhead under shortened TTI. Instead of carrying all the information required for one TTI data reception as previously done, some control information in a DCI, which may not vary from time to time may be common for multiple TTIs, would be signaled once but not in every TTI. UE would assume the same content applied for multiple TTIs. This type of DCI is also called slow DCI. On the other hand, there would still be some information which would vary between TTIs would be signal for each TTI, which is known as fast DCI. For receiving data in one TTI, UE may need to combine/concatenate slow DCI and fast DCI to obtain the required information.

Conclusion for Study Till RAN1#85:
  Two-level DCI can be studied for sTTI scheduling, whereby:
    DCI for sTTI scheduling can be divided into two types:
      "Slow DCI": DCI content which applies to more than 1 sTTI is carried on either legacy PDCCH, or sPDCCH transmitted not more than once per subframe
        FFS whether "Slow DCI" is UE-specific or common for multiple UEs
      "Fast DCI": DCI content which applies to a specific sTTI is carried on sPDCCH
      For a sPDSCH in a given sTTI, the scheduling information is obtained from either:
        a combination of slow DCI and fast DCI, or
        fast DCI only, overriding the slow DCI for that sTTI
    Compare with single-level DCI carried on one sPDCCH or one legacy PDCCH.
    It is not precluded to consider schemes in which the slow DCI also includes some resource allocation information for the sPDCCH.
  Methods for reducing the overhead of single-level DCI can also be studied
    Single-level DCI multi-sTTI scheduling for a variable number of sTTIs may be included
  Aim to reduce the number of schemes under consideration at RAN1#85.

An example of content of slow DCI and fast DCI, as described in 3GPP R1-163068, is provided below. Also, some examples of new TTI structure with different TTI length are described in 3GPP R1-163068 as follows:

2-Stage DCI Design

Since the TTI is shorter, it is critical to limit the control overhead in the transmission. A 2-stage DCI design might help in this. In particular, a stage 0 DCI can carry slowly varying portion of the grant and a stage 1 DCI can carry fast varying portion of the grant.

As an example, stage 0 DCI may carry the following information fields:
  UL/DL grant identifier, similar to the 1-bit differentiator for DCI formats 0/1A
  Base MCS, which indicates a set of MCS values for rate adaptation to a large extent
  TPC
  Stage 1 DCI scheduling information, e.g., the aggregation level(s) and/or the decoding candidate(s) of a given aggregation level, in order to reduce the number of blind decodes for stage 1 DCI On the other hand, Stage 1 DCI may carry the following information fields:
  HARQ process ID
  Resource allocation
  sPDSCH rate matching indication, which can alleviate potential resource fragmentation due to sPDCCH or legacy traffic
  Precoding Info and antenna ports information
  NDI
  Additional MCS information, which can provide updated MCS information with respect to that of stage 0 DCI
  UL RS related information, which can provide indication on UL channel structure particularly for sPUCCH The transmission of stage 0 DCI may be on a per need basis, while the transmission of stage 1 DCI may accompany with each sPDSCH. With the 2-stage DCI design, it is expected that DL control overhead savings can be realized.

It may help increase the coverage area of shortened TTI transmissions. As a result, we propose:

Besides, a cell supporting short TTI length may also need to support regular 1 ms TTI length, therefore within 1 ms there may be PDSCH (Physical Downlink Shared Channel) with regular TTI length as well as sPDSCH with shorter TTI length (e.g., 0.2 ms). An effective way to multiplex UE with different TTI lengths is to put them on different frequency resources, e.g., different PRB (Physical Resource Block). Therefore, it would be beneficial to signal the frequency resource occupied by short TTI to the UE to decode corresponding sPDCCH.

3GPP R1-163322 provides an example which uses slow DCI to indicate the short TTI frequency resource and decode sPDCCH within the indicated resource. 3GPP R1-163322 also provides an example of shortened TTI structure. Relevant portions of 3GPP R1-163322 are as follows:

Separating Slow and Fast DCIs

Since scheduling and control information is transmitted more often when using short TTIs, it is necessary to limit the amount of information transmitted on the fast time scale to keep the overhead at a reasonable level. Further for delay purpose it is important to have DL or UL DCI message sent as close in time to the corresponding PDSCH or PUSCH. Moreover, to be able to mix UEs in DL and UL of different TTI length on adaptive manner it would be beneficial to be able to update in each subframe how many PRBs pairs are set aside for short TTI operation in both UL and DL. This needs to be indicated to the UEs. Therefore, part of the control information should be transmitted on a slower timescale, and should be directed to a group of sTTI UEs. Two new types of DCIs should be introduced for sTTI transmission; the non-UE specific slow DCI and the UE specific fast DCI. For the addressing of slow DCI a sTTI UE specific group RNTI is required. The slow DCI can be sent in PDCCH, while the fast DCI should be sent inband on the short TTI timescale. An example of this setup is shown in Fig. 1.

The slow DCI message would consequently indicate the frequency allocation of the sTTI band to use by the UEs. The slow DCI message should therefore give the PRB pairs that define the sTTI band. There can be two separate slow DCI messages to indicate the sTTI band in UL and the one in DL separately. Alternatively, a single slow DCI message can contain the information about both the sTTI band in UL and the one in DL.

The assignment for each sPDSCH transmission must be UE specific. As discussed in [5], this fast DL DCI is transmitted in DL within the frequency allocation for DL short TTIs, the DL sTTI band. This new DCI might be based on current DCI format 2C in order to support high spectral efficiency with multiple antennas. Recall that the resource allocation for sPDSCH is given by the slow DL DCI as discussed above. Thus, the fast DL DCI does not need to contain the resource allocation field. However there may still be some advantage to support a simplified mechanism in order to be able to schedule multiple UEs within the same sTTI and sTTI band.

Similar as in the DL the sPUSCH would need to be assigned from each corresponding sTTI in DL. The design assumptions are very similar to the DL case with the difference that either DCI format 0 or DCI format 4 can be used as basis. Similarly as for DL, additional field may be needed for instance to support a simplified mechanism for multiplexing several UEs within the same UL sTTI band.

Further in order to support asynchronous HARQ as proposed in [5] the scheduled HARQ processes should be mentioned in the fast DCI.

Proposal

To limit control overhead, the sTTI control and scheduling information should be divided onto a fast and a slow DCI type.

Slow DCI(s) should be non-UE specific and addressed with a group RNTI in PDCCH in the common search space.

It indicates resources used within a subframe for an sTTI band in DL, UL or both The fast DCI should be UE specific and sent inband on the short TTI timescale.

DL assignment based on DCI format 2C with a simplified resource allocation field UL grant based on DCI format 4 or 0, with additional fields for length of TTI, HARQ process number, dynamic delay from grant to transmission, and simplified resource allocation field.

The handling transmission with different TTI lengths was also discussed at RAN1#84bis chairman's note as follows:

Agreements:

A UE is expected to handle the following cases in the same carrier in a subframe Receiving legacy TTI non-unicast PDSCH (except FFS for SC-PTM) and short TTI unicast PDSCH Receiving legacy TTI non-unicast PDSCH (except FFS for SC-PTM) and legacy TTI unicast PDSCH(s)

FFS between:

Alt 1: A UE is not expected to receive legacy TTI unicast PDSCH and short TTI unicast PDSCH simultaneously on one carrier Alt 2: If the UE is scheduled with legacy TTI unicast PDSCH and short TTI unicast PDSCH simultaneously on one carrier, then it may skip the decoding of one of them (FFS rules for determining which one)

Alt 3: A UE is expected to receive legacy TTI unicast PDSCH and short TTI unicast PDSCH simultaneously on one carrier FFS UE behaviour in case of being scheduled with legacy TTI unicast PDSCH and short TTI unicast PDSCH simultaneously with legacy TTI non-unicast PDSCH (except FFS for SC-PTM) on the same carrier A UE can be dynamically (with a subframe to subframe granularity) scheduled with legacy TTI unicast PDSCH and/or (depends on outcome of FFS above) short TTI PDSCH unicast Agreements:

A UE can be dynamically (with a subframe to subframe granularity) scheduled with PUSCH and/or sPUSCH A UE is not expected to transmit PUSCH and short TTI sPUSCH simultaneously on the same REs, i.e. by superposition FFS whether a UE may transmit PUSCH and short TTI sPUSCH in the same subframe on one carrier by puncturing PUSCH FFS whether a UE may transmit PUSCH and short TTI sPUSCH in different PRBs on the same symbol(s)

Dropping/prioritization rules (if any) are FFS

In general, the scheduling opportunity of UL grant may not be equal to the number of TTI within a subframe may not be equal to the available UL sTTI in one subframe. One example of such discrepancy is the TTI length of UL and that of DL are different. A second example is the presence of legacy control channel. To preserve the back ward compatibility, legacy control region may need to be excluded from the sTTI, which means the available OFDM symbol in one subframe for DL sTTI would be, for example, 12 OFDM symbols if 2 OFDM symbols are occupied by legacy control region. On the other hand, all 14 SC-FDMA (Single Carrier—Frequency Division Multiple Access) symbols would be available for UL sTTI.

Figure 19:
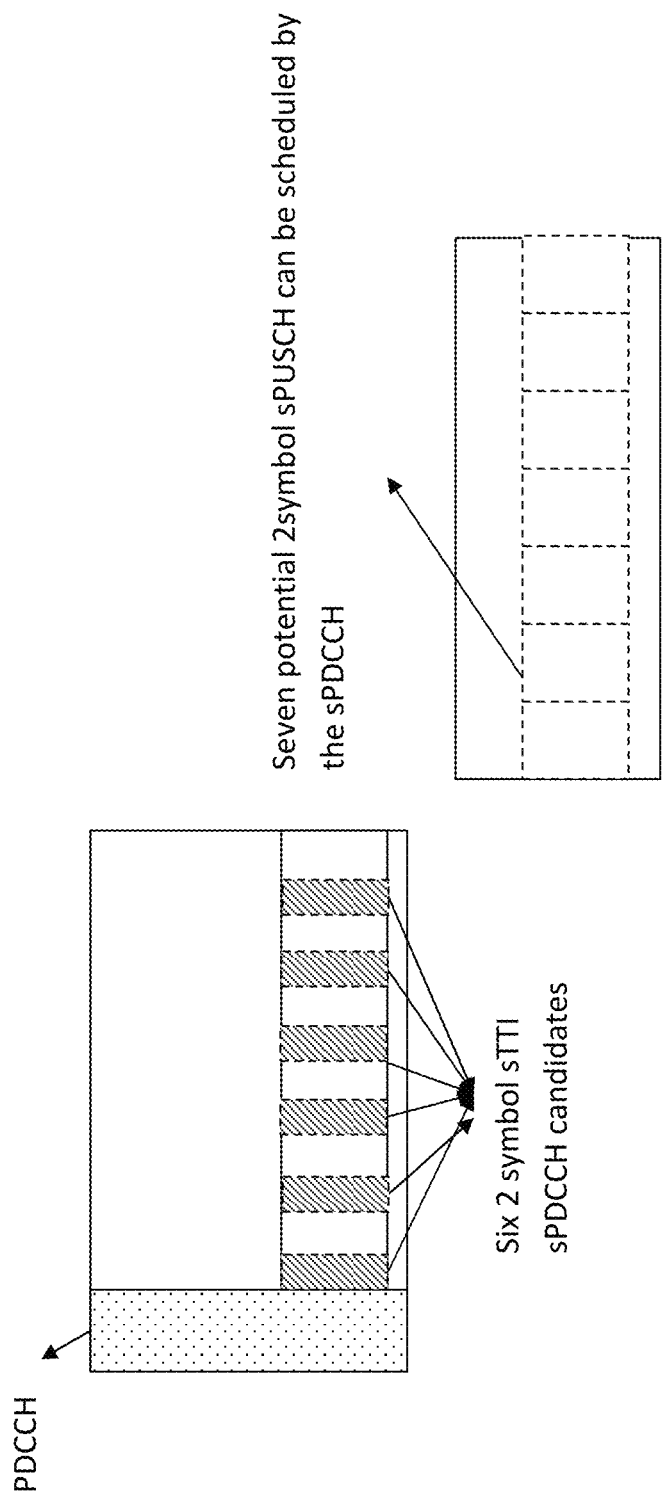
FIG. 19 is a diagram according to one exemplary embodiment.

Taking 2 OFDM-length sTTI for both UL and DL as an example, the available UL sTTI is 7 while the available DL sTTI is 6. An example is given in FIG. 19. A way to associate sPDCCH and sPUSCH in such a case needs to be developed.

Throughout the application, UL sTTI may mean the duration of UL data channel (e.g., sPUSCH). Furthermore, throughout the application, DL sTTI may mean the duration of DL data channel (e.g., sPDSCH). DL sTTI may also include duration of DL control channel (e.g., sPDCCH).

First General Concept—

A first general concept of this invention is to map less scheduling opportunity of DL sTTI to a larger number of UL sTTI. In one embodiment, at least one DL sTTI would contain more than one uplink grants which scheduling at least two different UL sTTIs. The two UL grants could be carried by different sPDCCHs. Alternatively, the two uplink grants could be carried by the same sPDCCH.

Figure 20:
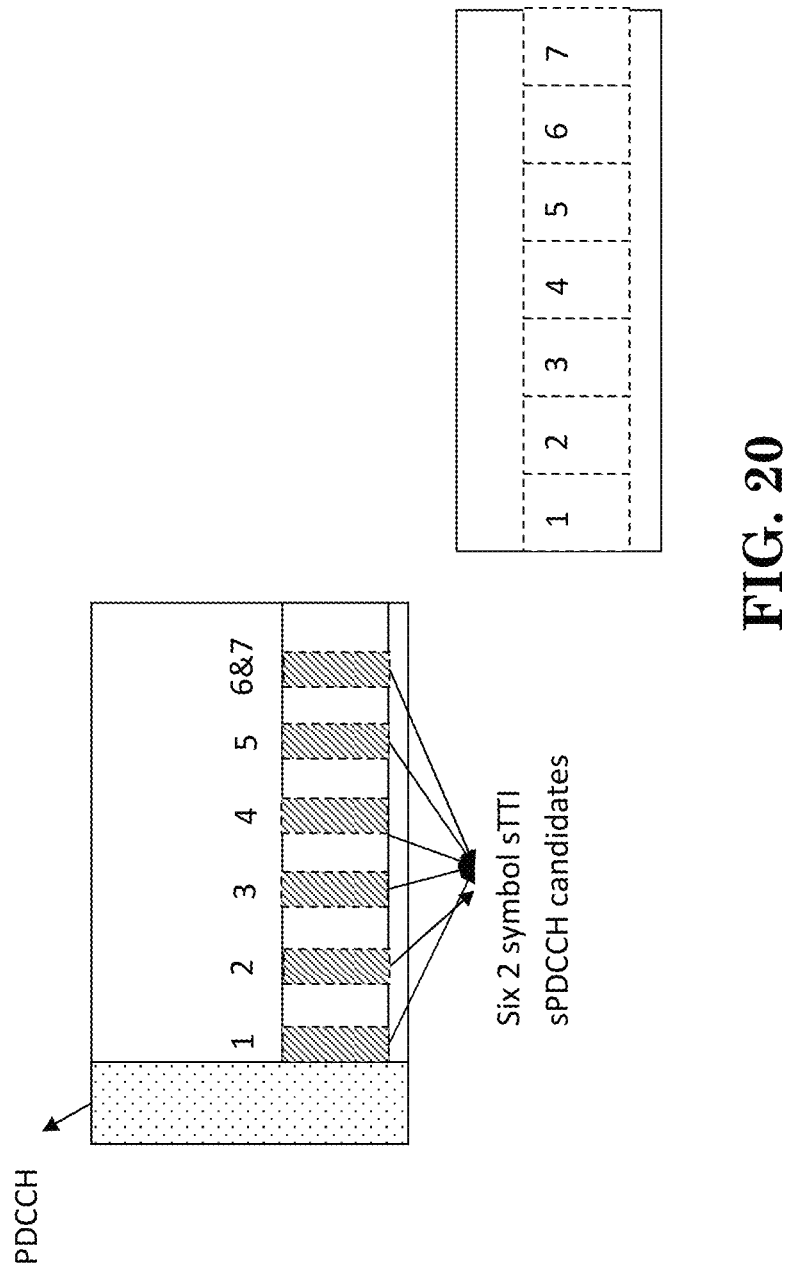
FIG. 20 is a diagram according to one exemplary embodiment.

The concept could be illustrated in an example with 6 DL sTTI in one subframe and 7 uplink sTTI in one subframe. In one example, there would be 5 DL sTTI each associate with a specific uplink sTTI and 1 DL sTTI associate with two uplink sTTI. An exemplary mapping is shown in FIG. 20.

Second General Concept—

A second general concept of this invention is to have the same number of sTTI within a subframe although the available number of symbols for DL sTTI and UL sTTI are different. In one embodiment, at least one uplink sTTI would be longer than the other uplink sTTI and would be an integer multiple of the other uplink sTTI. In another embodiment, legacy control region can be used to schedule at least one uplink sTTI.

Figure 21:
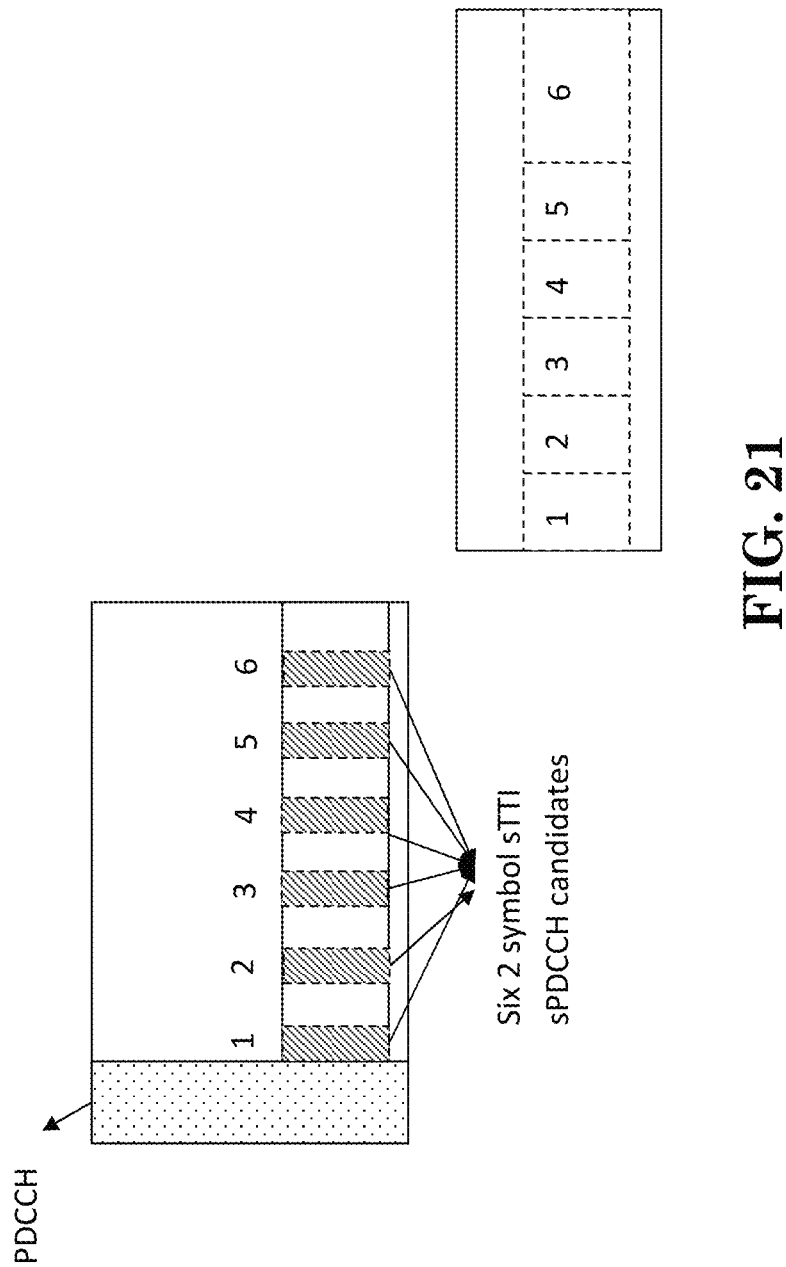
FIG. 21 is a diagram according to one exemplary embodiment.

The concept could be illustrated in an example with 6 DL sTTI in one subframe and 7 uplink sTTI in one subframe. In one example, there would be 5 uplink sTTIs with TTI length SC-FDMA symbols and 1 uplink sTTI with 4 SC-FDMA symbols. As a result, there could be 6 uplink sTTI as well as 6 downlink sTTI within one subframe and there can be a one-to-one mapping for scheduling. An example of mapping is given in FIG. 21, where the sixth sPUSCH is longer than (twice of) the rest of sPUSCH within a subframe.

Figure 22:
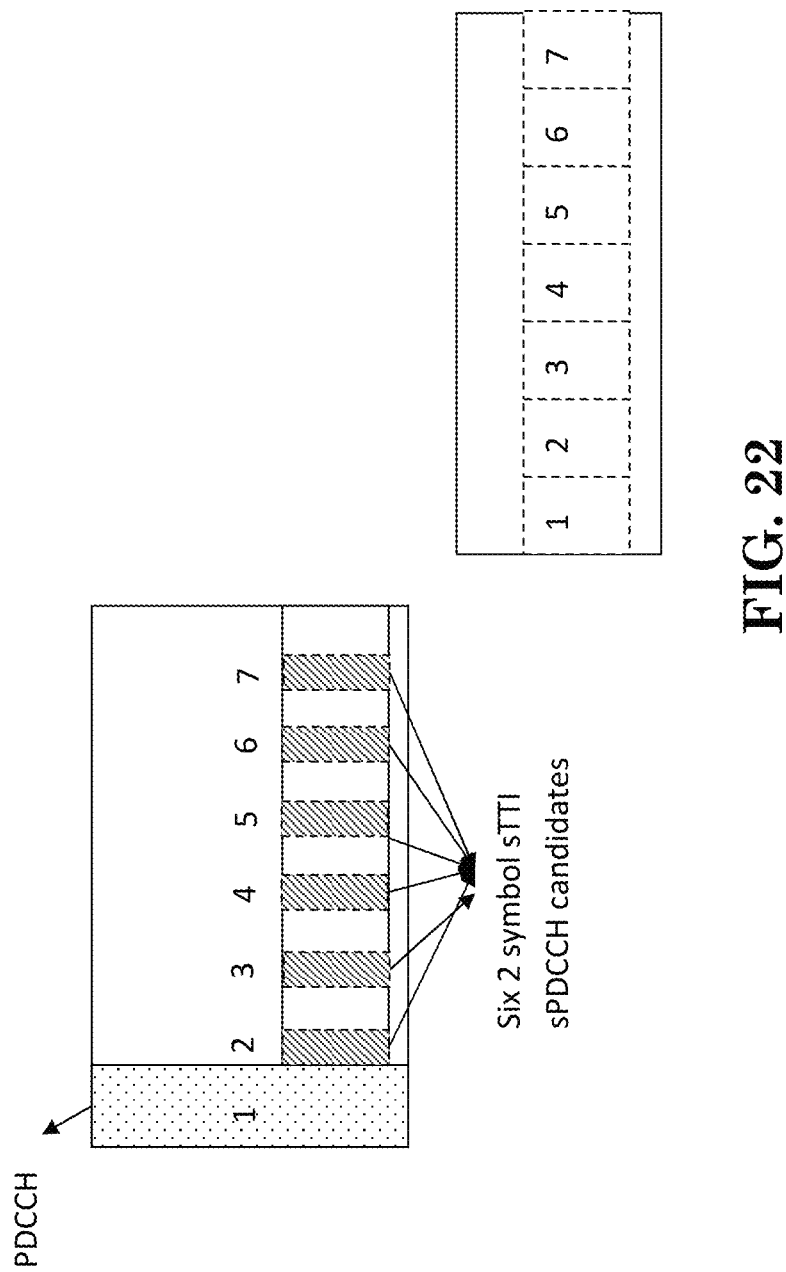
FIG. 22 is a diagram according to one exemplary embodiment.

In another example, there would be control signaling in legacy control region associated with a specific UL sTTI and 6 sPDCCH each associated with a specific UL sTTI. As a result, there could be 7 scheduling opportunities each associated with 7 uplink sTTI; and there can be a one-to-one mapping for scheduling. An example of mapping is given in FIG. 22.

To schedule a uplink sTTI within legacy control region, in one embodiment, the uplink grant associated with a specific uplink sTTI could be carried on a PDCCH which is used to carry slow DCI. In another embodiment, the uplink grant associated with a specific uplink sTTI could be carried on a special PDCCH which carries multiple uplink grants for sTTI. More specifically, the multiple uplink grants could be for different uplink sTTI lengths. Alternatively, the multiple uplink grants could be for the same uplink sTTI length. Furthermore, a specific RNTI is used to identify the special PDCCH.

In one embodiment, the uplink grant associated with a specific uplink sTTI is carried on part of the CCE (Control Channel Element) and not carried on the rest of the CCE. For example, the uplink grant can be carried on a channel (e.g., a special sPDCCH) occupying 3 legacy resource element group, wherein each resource element group comprises 4 resource elements. The 6 remaining REG of the same CCE can be used for other purposes, such as being used to carry another uplink grant(s) for sTTI or being used to carry downlink assignment(s) for sTTI. The sub-CCE partition can contain multiple levels for example a channel comprise 3 REGs and 6 REGs. The uplink grant associated with a specific uplink sTTI may contain whole information required for performing the uplink transmission in the uplink sTTI. Alternatively, the uplink grant associated with a specific uplink sTTI needs to be interpreted together with the slow DCI to perform the uplink transmission in the uplink sTTI.

One legacy CCE can be split into multiple control channel candidates (for example, 3 candidates with each comprising 3 REGs). The control channel candidate may need to be interpreted together with another PDCCH to get the whole control information. More specifically, the PDCCH carries a slow DCI.

In one embodiment, the UE could determine the CCE where multiple control channel candidates may be present according to UE ID. Furthermore, the UE could be configured with a CCE which is used to monitor the multiple control channel candidates. In addition, all UEs would monitor the control channel candidate within a same set of CCE for multiple control channel candidates. Also, the number of CCE for this purpose may be more than one.

Figure 23:
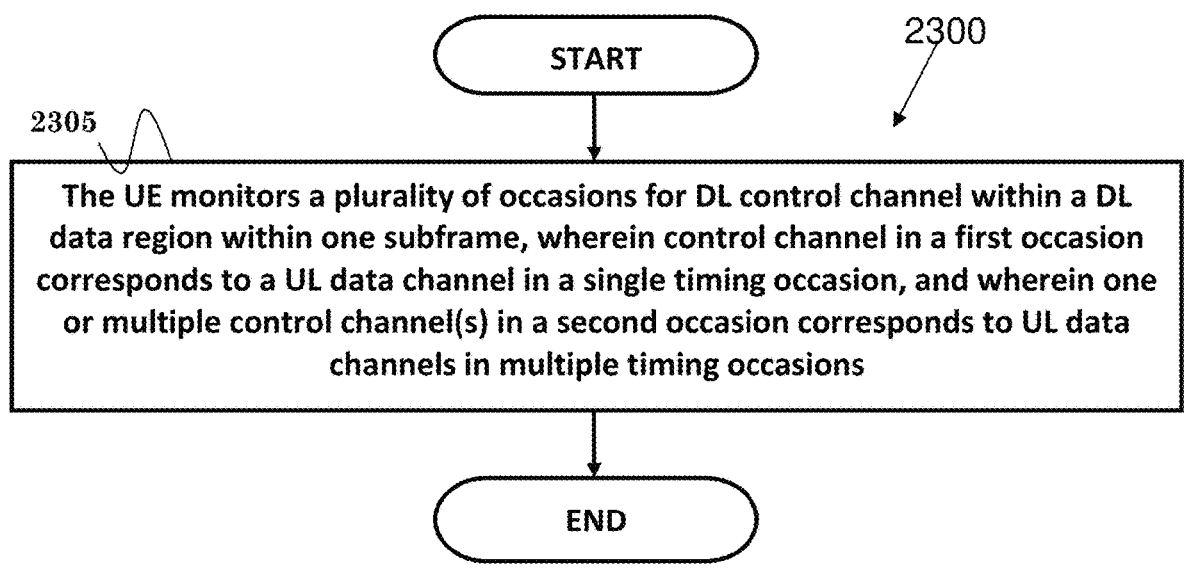
FIG. 23 is a flow chart according to one exemplary embodiment.

FIG. 23 is a flow chart 2300 according to one exemplary embodiment from the perspective of a UE. In step 2305, the UE monitors a plurality of occasions for DL control channel within a DL data region within one subframe, wherein control channel in a first occasion corresponds to a UL data channel in a single timing occasion, and wherein one or multiple control channel(s) in a second occasion corresponds to UL data channels in multiple timing occasions.

In one embodiment, one control channel in the second occasion could correspond to uplink data channel transmission in multiple timing occasions. Furthermore, each of multiple control channels in the second occasion could correspond to uplink data channel transmission in one timing occasion.

Referring back to FIGS. 3 and 4, in one exemplary embodiment of a UE, the device 300 includes a program code 312 stored in the memory 310. The CPU 308 could execute program code 312 to enable the UE to monitor a plurality of occasions for DL control channel within a DL data region within one subframe, wherein control channel in a first occasion corresponds to a UL data channel in a single timing occasion, and wherein one or multiple control channel(s) in a second occasion corresponds to UL data channels in multiple timing occasions. Furthermore, the CPU 308 can execute the program code 312 to perform all of the above-described actions and steps or others described herein.

Figure 24:
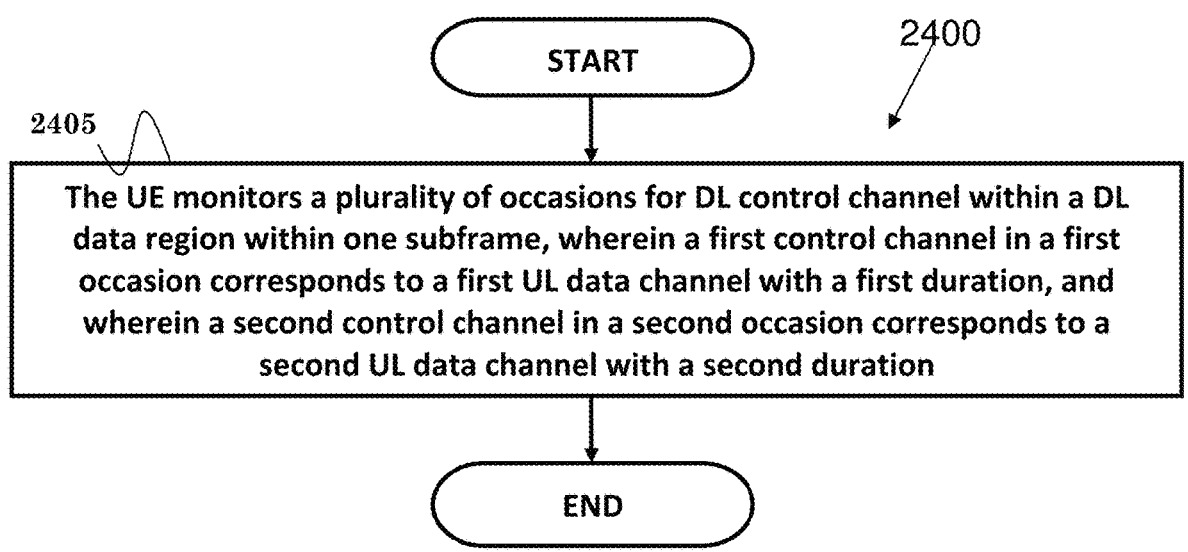
FIG. 24 is a flow chart according to one exemplary embodiment.

FIG. 24 is a flow chart 2400 according to one exemplary embodiment from the perspective of a UE. In step 2405, the UE monitors a plurality of occasions for DL control channel within a DL data region within one subframe, wherein a first control channel in a first occasion corresponds to a first UL data channel with a first duration, and wherein a second control channel in a second occasion corresponds to a second UL data channel with a second duration.

In one embodiment, the first duration and the second duration are different. Furthermore, the first duration could be an integer multiple of the second duration. In addition, the first data channel and the second data channel could be within a subframe.

Referring back to FIGS. 3 and 4, in one exemplary embodiment of a UE, the device 300 includes a program code 312 stored in the memory 310. The CPU 308 could execute program code 312 to enable the UE to monitor a plurality of occasions for DL control channel within a DL data region within one subframe, wherein a first control channel in a first occasion corresponds to a first UL data channel with a first duration, and wherein a second control channel in a second occasion corresponds to a second UL data channel with a second duration. Furthermore, the CPU 308 can execute the program code 312 to perform all of the above-described actions and steps or others described herein.

Figure 25:
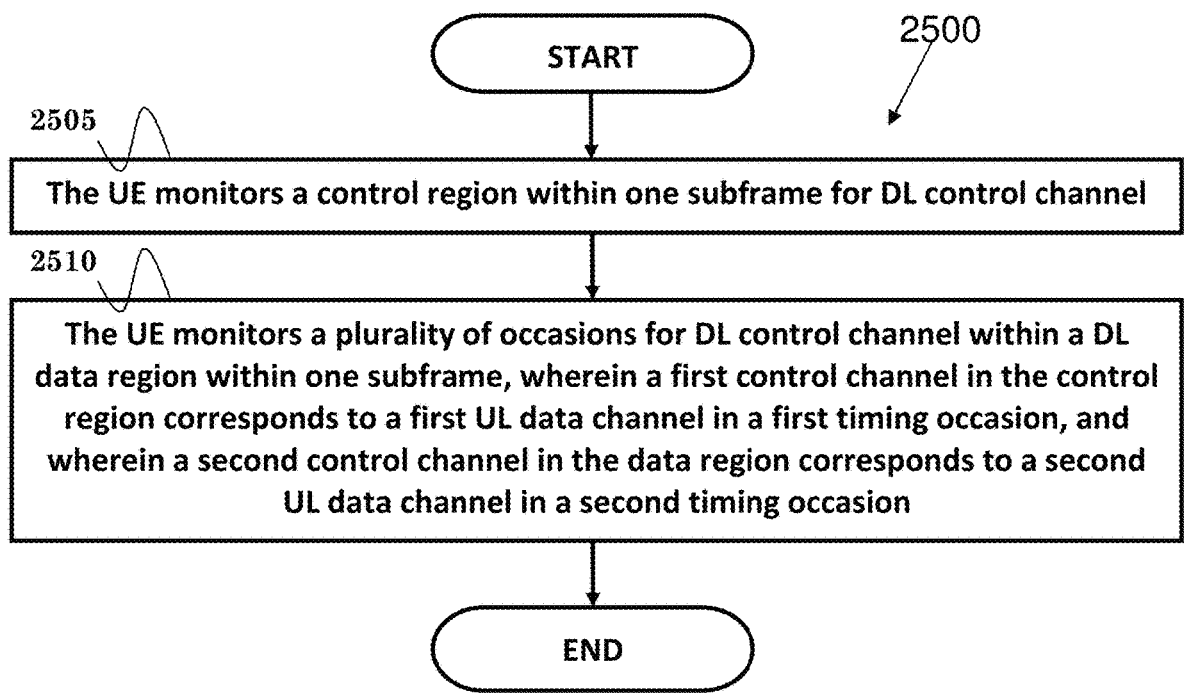
FIG. 25 is a flow chart according to one exemplary embodiment.

FIG. 25 is a flow chart 2500 according to one exemplary embodiment from the perspective of a UE. In step 2505, the UE monitors a control region within one subframe for DL control channel. In step 2510, the UE monitors a plurality of occasions for DL control channel within a DL data region within one subframe, wherein a first control channel in the control region corresponds to a first UL data channel in a first timing occasion, and wherein a second control channel in the data region corresponds to a second UL data channel in a second timing occasion.

In one embodiment, the first control channel occupies an entire DL system bandwidth, and the second control channel occupies part of DL system bandwidth. In addition, the first data channel and the second UL data channel could be within one subframe. Furthermore, the first control channel could indicate uplink grant for another UE.

In one embodiment, the first control channel could occupy three resource element groups. In addition, the first control channel could occupy part of a control channel element (CCE). Furthermore, multiple control channels could exist in a CCE.

In one embodiment, the UE could determine which CCE to monitor the first control channel based on a UE ID or on configuration. In addition, all UEs would monitor the first control channel on the same CCE.

Referring back to FIGS. 3 and 4, in one exemplary embodiment of a UE, the device 300 includes a program code 312 stored in the memory 310. The CPU 308 could execute program code 312 to enable the UE (i) to monitors a control region within one subframe for DL control channel, and (ii) to monitors a plurality of occasions for DL control channel within a DL data region within one subframe, wherein a first control channel in the control region corresponds to a first UL data channel in a first timing occasion, and wherein a second control channel in the data region corresponds to a second UL data channel in a second timing occasion. Furthermore, the CPU 308 can execute the program code 312 to perform all of the above-described actions and steps or others described herein.

In general, the intention of shortening TTI length is to reduce the processing time so as to reduce the overall latency. Considering processing time, PDCCH-like structure is preferred as UE can receive the first several symbols (e.g., 1~3) and can start decode control channel earlier. On the other hand, for ePDCCH structure, UE has to receive the whole subframe and start decoding, so that processing time cannot be reduced to a large extent.

Figure 26:
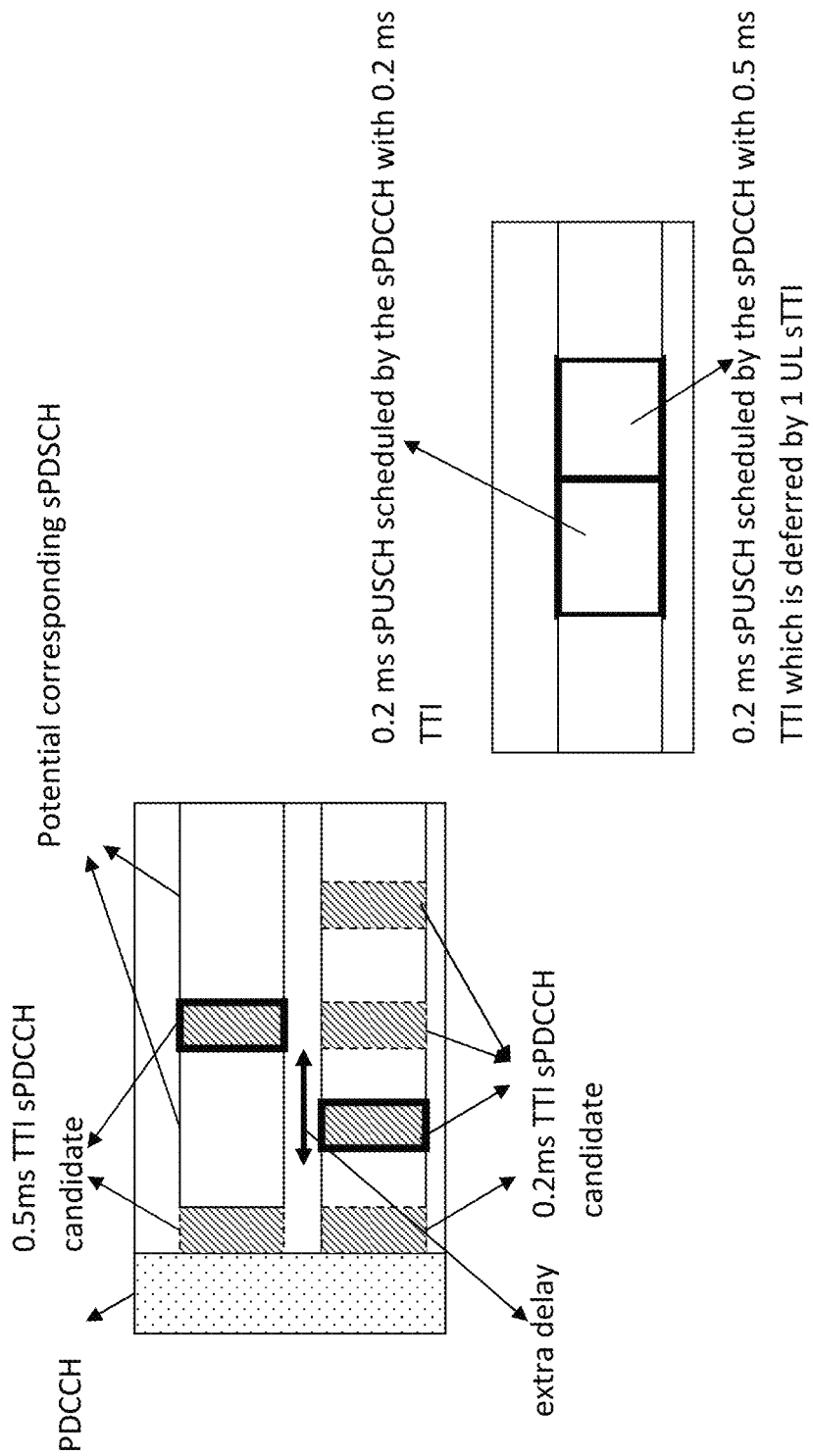
FIG. 26 is a diagram according to one exemplary embodiment.

The PDCCH-like structure may have some drawbacks. First, the PDCCH-like structure would lead to a control channel design fulfilling the DL scheduling latency requirement, as there would be at least control channel candidate every DL TTI. It means that if the DL TTI and UL TTI length are different, control signaling for scheduling UL may be either too excessive or insufficient, and UL latency requirement may be bounded by that of downlink and not be fulfilled. For example, if the DL TTI length is 0.5 ms (e.g., 7 OFDM symbols) and UL TTI length is 0.2 ms (e.g., 3 SC-FDMA symbols), following PDCCH-link design, there would be control region every 0.5 ms. Although there could be a UL data channel every 0.2 ms, eNB has to wait for the scheduling opportunity for the UL and an average delay of 0.25 ms would be induced which is even larger than the UL TTI length, comparing to an average delay of 0.1 ms when both UL TTI and DL TTI length are 0.2 ms. As an result, sPUSCH may be delayed to a next UL sTTI, as illustrated in FIG. 26.

Figure 27:
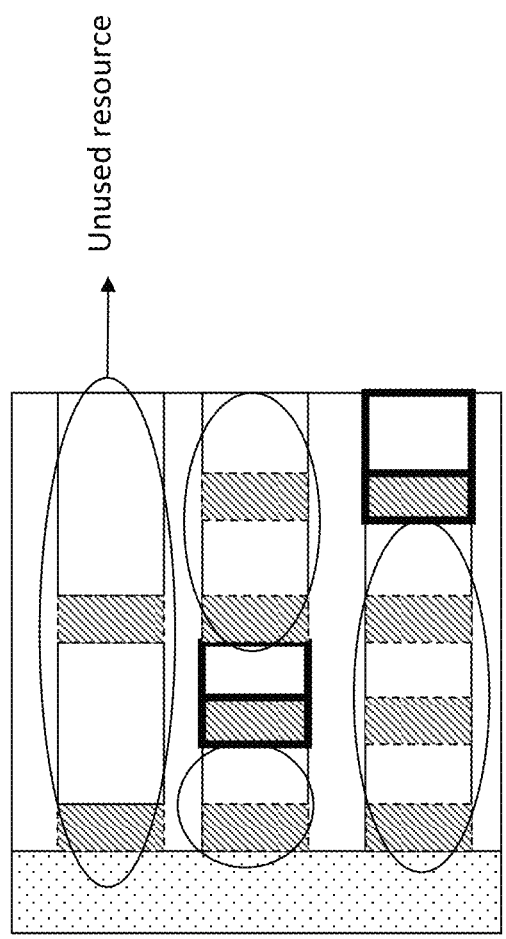
FIG. 27 is a diagram according to one exemplary embodiment.

The PDCCH structure could induce extra latency when DL TTI and UL TTI length are different. A second drawback of PDCCH-like structure is overhead. sPDCCH would occupy part of the resource allocated for sPDSCH. As discussed in 3GPP R1-163322, UE with different TTI lengths may be allocated with different frequency resources. UE with the same TTI length may also be allocated with different frequency resources. However, a service with low latency may start within a 1 ms subframe so that control channel opportunities should be preserved and multiple frequency resources would be allocated for UEs with the same or different TTI lengths while there may not be actual traffic ongoing. In short, it is hard for UEs with the same or different TTI lengths to reduce the unused resource with PDCCH-like structure, as illustrated in FIG. 27. Also, for the case where there is only UL data traffic at least from one UE perspective, the PDCCH-like structure would also induce some overhead as the region for DL data cannot be utilized.

Third General Concept—

The third general concept of this invention is that there is one set of frequency resource/region allocated for sPDSCH and another set of resource/region allocated for sPDCCH, wherein one sPDCCH would occupy part of the OFDM symbols, e.g., 1 OFDM symbol, within corresponding sPDSCH duration. Furthermore, the two sets of frequency resource/region are different. In addition, the two sets of frequency resource/region does not overlap in frequency domain. Also, the two sets of frequency resource/region overlap in time domain.

Figure 28:
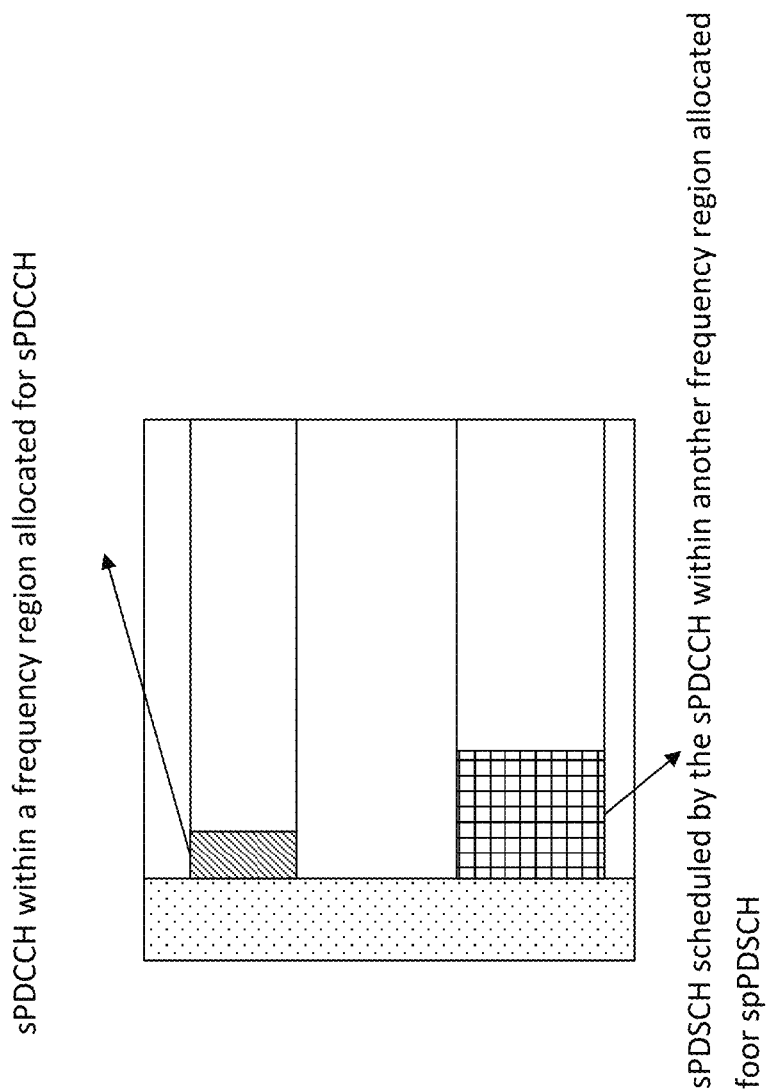
FIG. 28 is a diagram according to one exemplary embodiment.

More specifically, the two sets of frequency resource/region are within a data region of 1 subframe (1 ms). In addition, one sPDCCH would not be carried on all the symbols in one corresponding sPDSCH duration. An example is illustrated in FIG. 28. More specifically, the sPDCCH within the allocated resource/region can carry uplink grant.

Throughout the application, the duration of sPDSCH may mean DL sTTI unless otherwise specified. The duration of sPUSCH may mean UL sTTI unless otherwise specified.

In one embodiment, the frequency resource/region for sPDSCH and the frequency resource/region for sPDCCH are indicated by the same control signaling (e.g., slow DCI on PDCCH).

In one embodiment, the frequency resource/region for sPDSCH and the frequency resource/region for sPDCCH are indicated by two separate control signalings respectively. More specifically, the two control signalings are two control channels, e.g., PDCCHs, CRC-scrambled with different RNTI. Furthermore, at least two RNTI would be allocated for shortened TTI operation, one for allocating resource/region for sPDCCH and the other allocated resource/region for sPDSCH. Alternatively, the frequency resources/regions for sPDSCH are indicated by a slow DCI and the frequency resources/regions for sPDCCH are indicated by higher layer configuration, e.g., RRC configuration.

Figure 29:
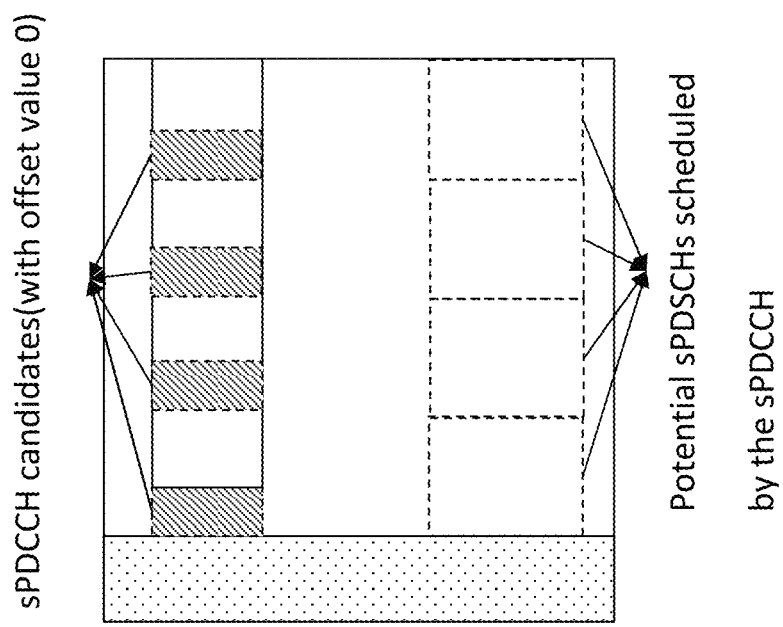
FIG. 29 is a diagram according to one exemplary embodiment.

In one embodiment, the UE monitors sPDCCH on every symbol within the region allocated for sPDCCH. Furthermore, UE may not receive every symbol within the resource/region allocated for sPDCCH. Some rule is specified for determining which symbol(s) UE should receive. In addition, UE would monitor one symbol out of every X symbols if the duration of sPDSCH is X symbols. An example is illustrated in FIG. 29.

More specifically, there is one to one mapping between the sPDCCH and its sPDSCH. In one embodiment, UE could monitor one symbol out of every Y symbols if the duration of sPUSCH is Y symbols. Furthermore, UE could monitor one symbol out of every Z symbols wherein Z is determined at least based on the duration of sPDSCH and the duration of PUSCH. In addition, UE may also need to determine which one symbol within the X/Y/Z symbols UE should monitor.

An offset value or indicator could be used to serve this purpose. For example, "value 0" could mean the first symbol of the X/Y/Z symbols, "value 1" could mean the second symbol of the X/Y/Z symbols, and so on. In one embodiment, the offset value/indicator could be carried by dedicated signal to the UE, e.g., RRC configuration or MAC control element. In addition, the offset value/indicator could be carried on PDCCH. More specifically, the offset value/indicator could be carried on slow DCI.

In one embodiment, the offset value depends on the type of sPDCCH, e.g., sPDCCH for uplink grant and sPDCCH for downlink assignment have different offset value. More specifically, a downlink assignment would have a smaller offset value.

In one embodiment, each OFDM symbol would contain only one sPDCCH. Alternatively, each OFDM symbol contains more than one sPDCCH.

In one embodiment, UEs with different TTI lengths could be allocated with the same set of resource/region for sPDCCH.

Figure 30:
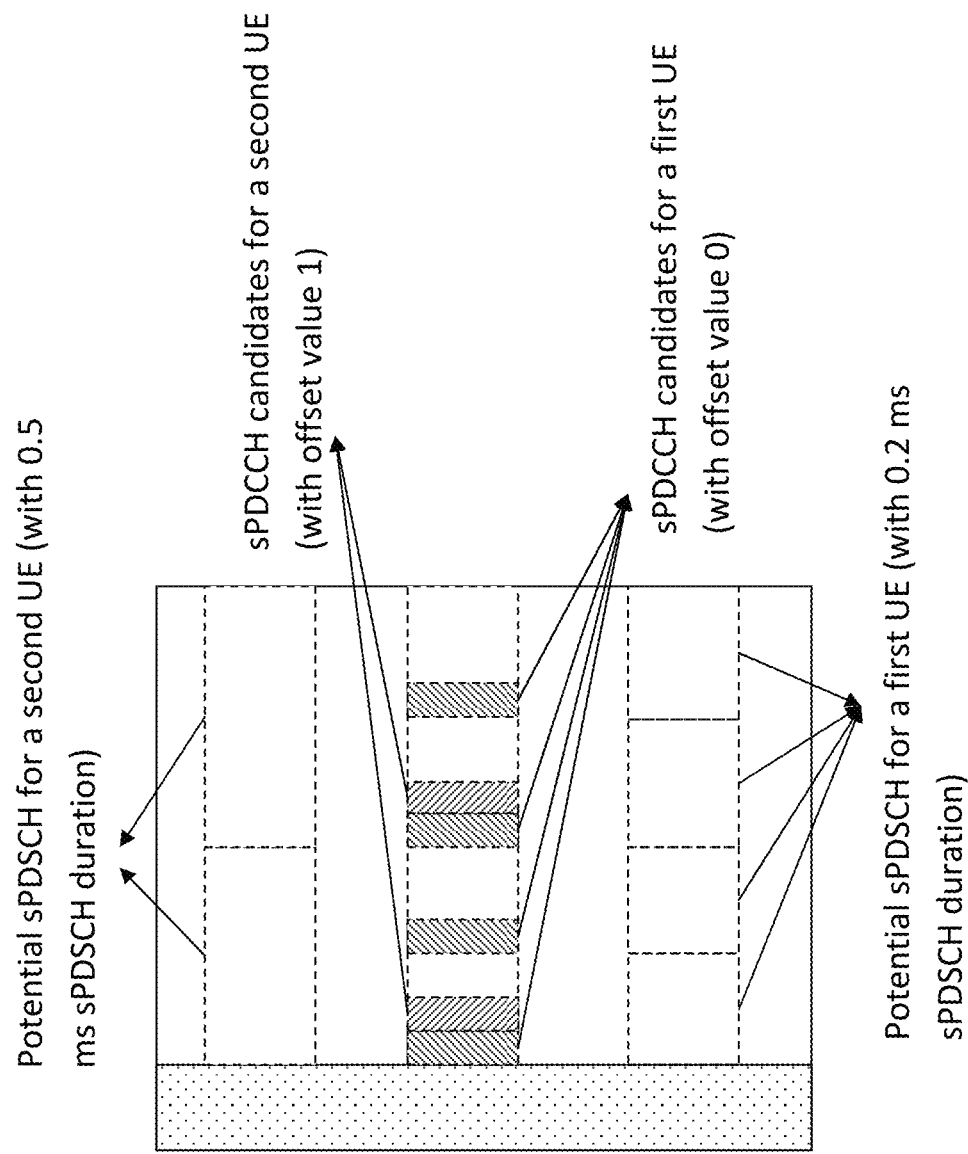
FIG. 30 is a diagram according to one exemplary embodiment.

From the eNB (evolved Node B) perspective, it is possible to schedule sPDSCH with different duration or sPDSCH with different frequency resource/region within a same frequency resource/region allocated for sPDCCH. An example is illustrated in FIG. 30. A common sPDCCH resource/region can be shared by more than one sPDSCH resource/region. Different sPDSCH resource/region may have the same sPDSCH duration or different sPDSCH duration. Furthermore, different sPDSCH resource/region may be indicated by different control signaling, e.g., slow DCI on PDCCH. A slow DCI could indicate UE where to monitor the sPDCCH within a region allocated for sPDCCH.

Figure 31:
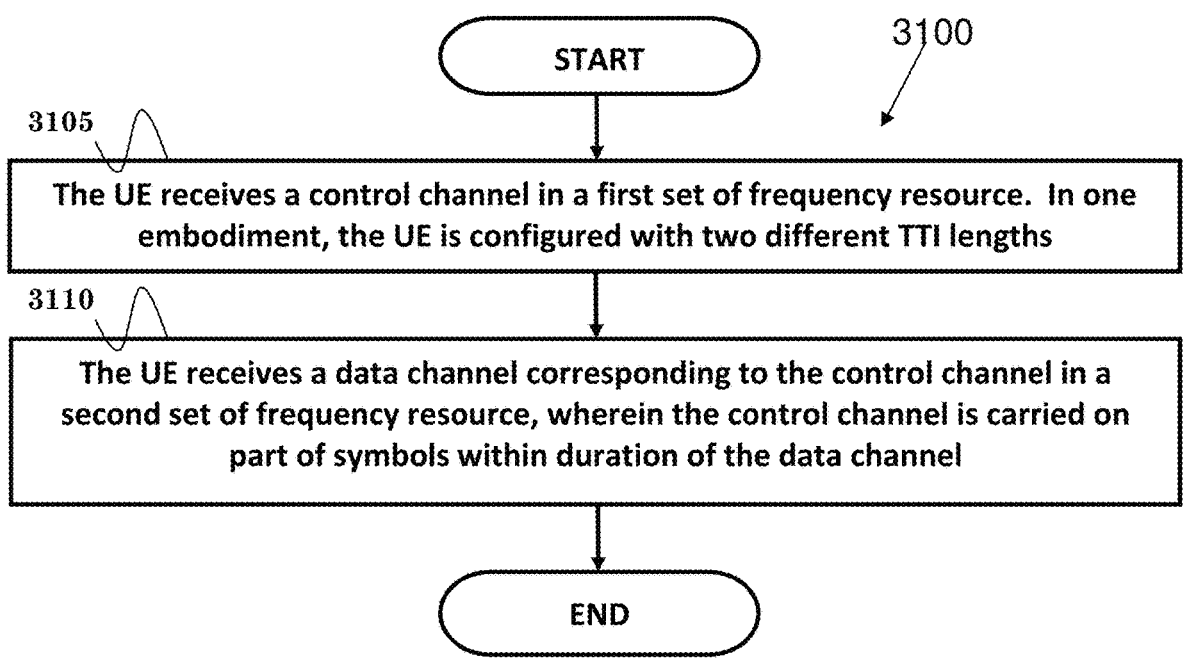
FIG. 31 is a flow chart according to one exemplary embodiment.

FIG. 31 is a flow chart 3100 according to one exemplary embodiment from the perspective of a UE. In step 3105, the UE receives a control channel in a first set of frequency resource. In one embodiment, the UE is configured with two different TTI lengths.

In step 3110, the UE receives a data channel corresponding to the control channel in a second set of frequency resource, wherein the control channel is carried on part of symbols within duration of the data channel. In one embodiment, the first set of frequency resource and the second set of frequency resource could be different. Furthermore, the first set of frequency resource and the second set of frequency resource do not overlap in frequency domain. In addition, the first set of frequency resource and the second set of frequency resource could be within a data region of a subframe. Also, wherein the first set of frequency resource and the second set of frequency resource could overlap in time domain.

In one embodiment, the first set of frequency resource and the second set of frequency resource could be indicated by one control signaling or by two separate control signalings. Furthermore, the first set of frequency resource and the second set of frequency resource could be indicated by two different types of control signaling. In one embodiment, the type of control signaling could be PDCCH, MAC (Medium Access Control) control element, or RRC configuration. Furthermore, the control signaling(s) could be a slow DCI. In addition, the control signalings could be scrambled with different RNTIs for signaling the first set of frequency resource and the second set of resource. Also, the first set of frequency resource could carry an uplink grant for a UL data channel.

In one embodiment, the UE could determine to monitor the control channel on which symbol(s) within the first set of frequency resource depending on the duration of the data channel. Furthermore, the UE could determine to monitor the control channel on which symbol(s) within the first set of frequency resource depending on the duration of UL data channel. The UE could also determine to monitor the control channel on which symbol(s) within the first set of frequency resource depending on the duration of the data channel and the duration of a UL data channel.

In one embodiment, the UE could monitor the control channel on the same symbol(s) within the first set of frequency resource for downlink assignment or uplink grant. The UE could also monitor the control channel on different symbol(s) within the first set of frequency resource for downlink assignment or uplink grant.

In one embodiment, there could be one occasion for the control channel within the first set of frequency resource every data channel duration. Furthermore, there could be one occasion for the control channel within the first set of frequency resource every UL data channel duration.

In one embodiment, an offset value could be applied when determining the symbol(s) to monitor the control channel. Furthermore, the offset value could be signaled on a control signaling. In addition, the control signaling could be a slow DCI.

In one embodiment, the offset value could be configured by a higher layer. Furthermore, the offset value could depend on the UE's identity, the duration of the data channel, the duration of a UL data channel, or a type of the control channel. Furthermore, the type of the control channel could be a downlink assignment or a uplink grant.

Referring back to FIGS. 3 and 4, in one exemplary embodiment of a UE, the device 300 includes a program code 312 stored in the memory 310. The CPU 308 could execute program code 312 to enable the UE (i) to receive a control channel in a first set of frequency resource, and (ii) to receive a data channel corresponding to the control channel in a second set of frequency resource, wherein the control channel is carried on part of symbols within duration of the data channel. Furthermore, the CPU 308 can execute the program code 312 to perform all of the above-described actions and steps or others described herein.

Figure 32:
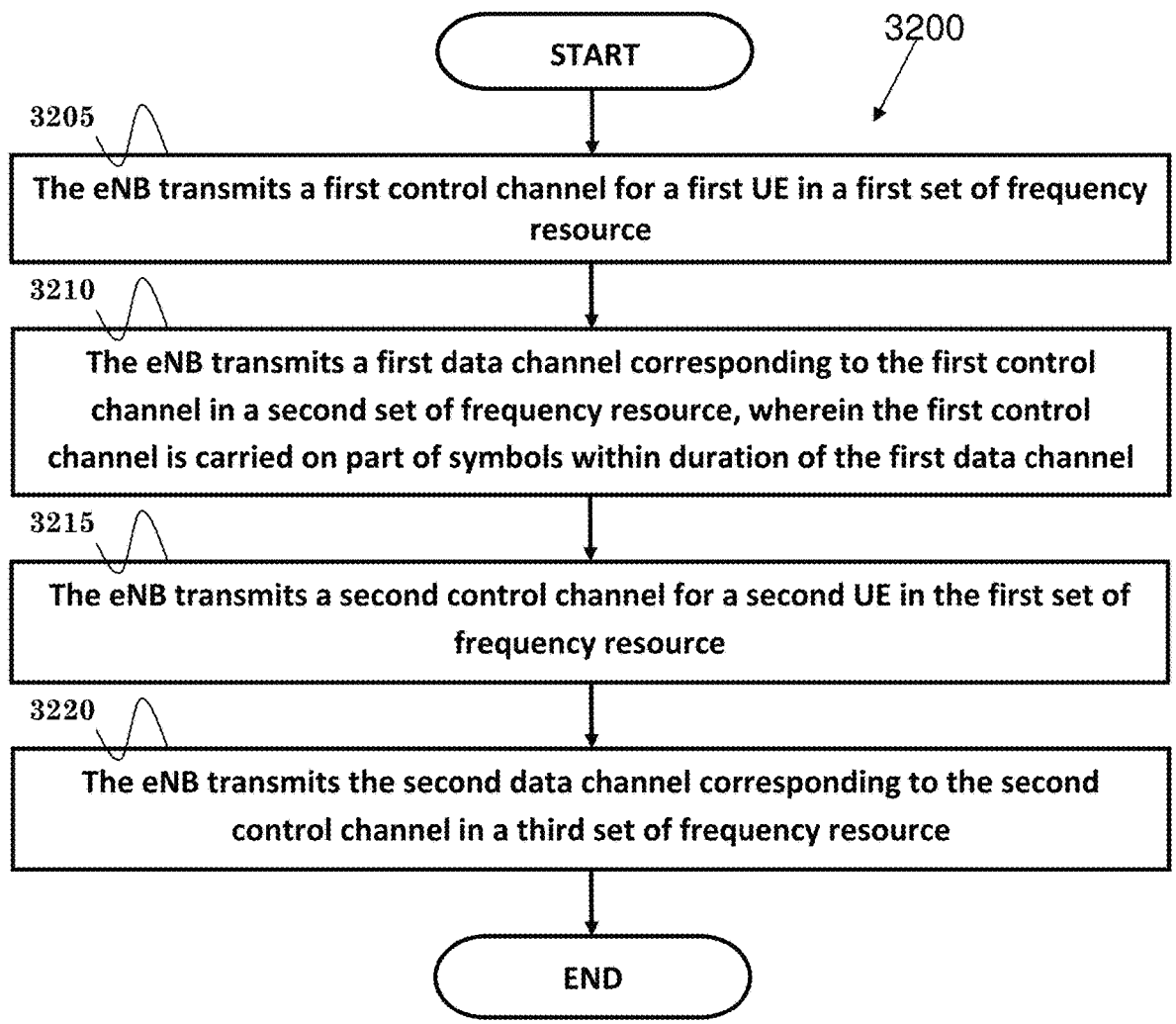
FIG. 32 is a flow chart according to one exemplary embodiment.

FIG. 32 is a flow chart 3200 according to one exemplary embodiment from the perspective of an eNB (evolved Node B). In step 3205, the eNB transmits a first control channel for a first UE in a first set of frequency resource. In one embodiment, the first UE could be configured with two different TTI lengths.

In step 3210, the eNB transmits a first data channel corresponding to the first control channel in a second set of frequency resource, wherein the first control channel is carried on part of symbols within duration of the first data channel. In one embodiment, the first set of frequency resource and the second set of frequency resource could be different. Furthermore, the first set of frequency resource and the second set of frequency resource do not overlap in frequency domain. In addition, the first set of frequency resource and the second set of frequency resource could be within a data region of a subframe. Also, the first set of frequency resource and the second set of frequency resource could overlap in time domain.

In one embodiment, the first set of frequency resource could carry an uplink grant for sPUSCH. In addition, the first set of frequency resource and the second set of frequency resource could be indicated by a control signaling or by two separate control signalings. The control signaling(s) could be a slow DCI. Furthermore, the control signalings could be scrambles with different RNTIs for signaling the first set of resource and the second set of resource. In addition, the first set of frequency resource and the second set of frequency resource could be indicated by two different types of control signaling. Also, a type of control signaling could be PDCCH, MAC control element, or RRC configuration.

In one embodiment, the opportunities for transmitting sPDCCH within the first set of resource could depend on the duration of sPDSCH and/or the duration of sPUSCH. Furthermore, the opportunities of transmitting sPDCCH within the first set of resource for downlink assignment and the opportunities of transmitting sPDCCH within the first set of resource for uplink grant could be different or the same. In addition, there could one opportunity of transmitting sPDCCH within the first set of resource every sPDSCH duration or every sPUSCH duration.

In one embodiment, an offset value could be applied when determining opportunities for transmitting sPDCCH. Furthermore, the offset value could signaled on a control signaling, which could be a slow DCI. In addition, the offset value could be configured by higher layer. In one embodiment, the offset value could depend on the UE's identity, the duration of sPDSCH, the duration of sPUSCH, or a type of sPDCCH. The type of sPDCCH could be a downlink assignment or an uplink grant.

In step 3215, the eNB transmits a second control channel for a second UE in the first set of frequency resource. In step 3220, the eNB transmits the second data channel corresponding to the second control channel in a third set of frequency resource.

In one embodiment, the first data channel and the second data channel could have different durations or the same duration. Furthermore, the first control channel and the second control channel could have different offset values or the same offset value.

In one embodiment, the first control channel could be a sPDCCH, and the second control channel could be a sPDCCH. Alternatively, the first data channel could be a sPDSCH, and the second data channel could be a sPDSCH.

Referring back to FIGS. 3 and 4, in one exemplary embodiment of an eNB, the device 300 includes a program code 312 stored in the memory 310. The CPU 308 could execute program code 312 to enable the eNB (i) to transmit a first control channel for a first UE in a first set of frequency resource, and (ii) to transmit a first data channel corresponding to the first control channel in a second set of frequency resource, wherein the first control channel is carried on part of symbols within duration of the first data channel.

In one embodiment, the CPU could further execute program code 312 to enable the eNB to transmit a second control channel for a second UE in the first set of frequency resource, and to transmit the second data channel corresponding to the second control channel in a third set of frequency resource. Furthermore, the CPU 308 can execute the program code 312 to perform all of the above-described actions and steps or others described herein.

Figure 33:
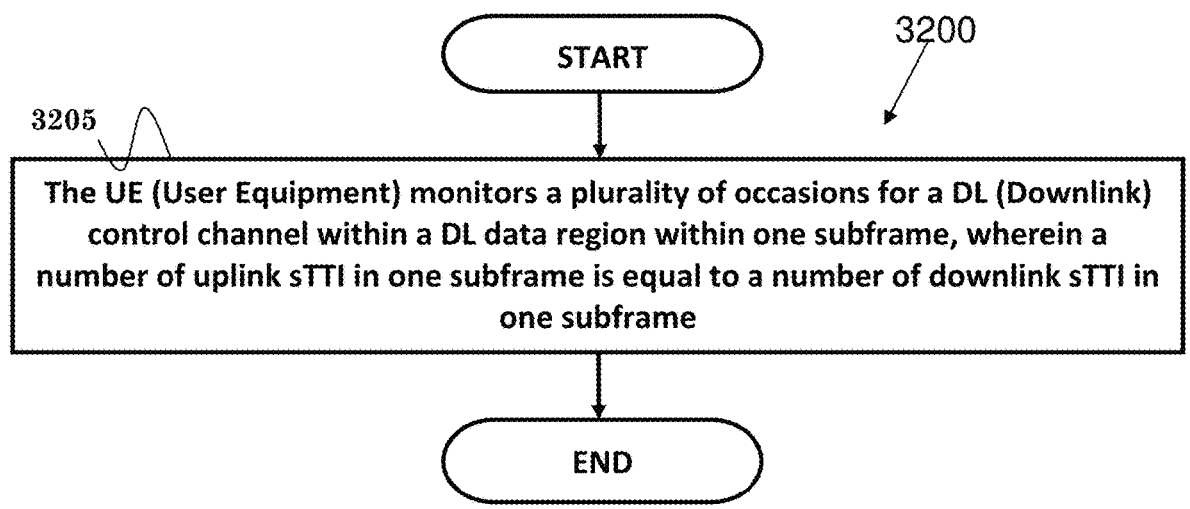
FIG. 33 is a flow chart according to one exemplary embodiment.

FIG. 33 is a flow chart 3300 according to one exemplary embodiment from the perspective of a UE. In step 3305, the UE monitors a plurality of occasions for a DL (Downlink) control channel within a DL data region within one subframe, wherein a number of uplink sTTI in one subframe is equal to a number of downlink sTTI in one subframe.

In one embodiment, a length of one uplink sTTI in a subframe is different from a length of one downlink sTTI in the subframe. Furthermore, at least one uplink sTTI could be longer than the other uplink sTTIs. In addition, one downlink sTTI could schedule one uplink sTTI.

Referring back to FIGS. 3 and 4, in one exemplary embodiment of an eNB, the device 300 includes a program code 312 stored in the memory 310. The CPU 308 could execute program code 312 to enable the eNB to monitors a plurality of occasions for a DL control channel within a DL data region within one subframe, wherein a number of uplink sTTI in one subframe is equal to a number of downlink sTTI in one subframe. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of performing uplink transmission in a UE (User Equipment), comprising:
    the UE (User Equipment) monitors a plurality of occasions for a DL (Downlink) control channel within a DL data region within one subframe from a base station,
    wherein the number of the plurality of occasions is smaller than a number of UL (Uplink) sTTIs (Shortened Transmission Time Intervals) within one subframe,
    wherein the DL control channel in a first occasion among the plurality of occasions schedules a first UL data channel with a first UL sTTI, and the DL control channel in a second occasion among the plurality of occasions schedules a second UL data channel with a second UL sTTI,
    wherein the first occasion and the second occasion are within one subframe, and the first UL data channel and the second UL data channel are within one subframe, and
    wherein the first UL sTTI and the second UL sTTI are different; and
    the UE performs transmission of the first UL data channel or the second UL data channel to the base station upon detection of the DL control channel in the first occasion or the DL control channel in the second occasion.

2. The method of claim 1, wherein the first duration is an integer multiple of the second duration.

3. The method of claim 1, wherein the first UL data channel and the second UL data channel are within a subframe.

4. The method of claim 1, wherein the DL control channel is a PDCCH (Physical Downlink Control Channel) for sTTI (Shortened Transmission Time Interval).

5. A method of performing uplink transmission in a UE (User Equipment), comprising:
    the UE (User Equipment) monitors a plurality of occasions for a DL (Downlink) control channel within a DL data region within one subframe,
    wherein the number of the plurality of occasions is smaller than a number of UL (Uplink) sTTIs (shortened Transmission Time Intervals) within one subframe,
    wherein the number of UL sTTIs within one subframe is equal to a number of DL sTTI in one subframe,
    wherein the DL control channel in a first occasion among the plurality of occasions in a first DL sTTI schedules a UL data channel in a first UL sTTI wherein a length of the first DL sTTI is different from a length of the first UL sTTI,
    wherein the DL control channel in a second occasion among the plurality of occasions in a second DL sTTI schedules the UL data channel in a second UL sTTI wherein a length of the second DL sTTI is the same as a length of the second UL sTTI, and wherein the first occasion and the second occasion are within one subframe, and the first UL sTTI and the second UL sTTI are within one subframe.

6. The method of claim 5, wherein the first DL sTTI and the second DL sTTI have a same length.

7. The method of claim 5, wherein at least one uplink sTTI is longer than other uplink sTTIs.

8. The method of claim 5, wherein one downlink sTTI schedules one uplink sTTI.

9. A User Equipment (UE) for performing uplink transmission, comprising:
   a control circuit;
   a processor installed in the control circuit; and
   a memory installed in the control circuit and operatively coupled to the processor;
   wherein the processor is configured to execute a program code stored in the memory to:
      monitor a plurality of occasions for a DL (Downlink) control channel within a DL data region within one subframe,
      wherein the number of the plurality of occasions is smaller than a number of UL (Uplink) sTTIs (Shortened Transmission Time Intervals) within one subframe,
      wherein the DL control channel in a first occasion among the plurality of occasions schedules a first UL data channel with a first UL sTTI, and the DL control channel in a second occasion among the plurality of occasions schedules a second UL data channel with a second UL sTTI,
      wherein the first occasion and the second occasion are within one subframe, and the first UL data channel and the second UL data channel are within one subframe, and
      wherein the first UL sTTI and the second sTTI are different; and
      the UE performs transmission of the first UL data channel or the second UL data channel to the base station upon detection of the DL control channel in the first occasion or the DL control channel in the second occasion.

10. The UE of claim 9, wherein the first duration is an integer multiple of the second duration.

11. The UE of claim 9, wherein the first UL data channel and the second UL data channel are within a subframe.

12. The UE of claim 9, wherein the DL control channel is a PDCCH (Physical Downlink Control Channel) for sTTI (Shortened Transmission Time Interval).

13. A User Equipment (UE) for performing uplink transmission, comprising:
   a control circuit;
   a processor installed in the control circuit; and
   a memory installed in the control circuit and operatively coupled to the processor;
   wherein the processor is configured to execute a program code stored in the memory to:
      monitor a plurality of occasions for a DL (Downlink) control channel within a DL data region within one subframe,
      wherein the number of plurality of occasions is smaller than a number of UL (Uplink) sTTIs (Shortened Transmission Time Intervals) within one subframe,
      wherein the number of UL sTTIs within one subframe is equal to a number of DL sTTI in one subframe,
      wherein the DL control channel in a first occasion among the plurality of occasions in a first DL sTTI schedules a UL data channel in a first UL sTTI wherein a length of the first DL sTTI is different from a length of the first UL sTTI,
      wherein the DL control channel in a second occasion among the plurality of occasions in a second DL sTTI schedules the UL data channel in a second UL sTTI wherein a length of the second DL sTTI is the same as a length of the second UL sTTI, and
      wherein the first occasion and the second occasion are within one subframe, and the first UL sTTI and the second UL sTTI are within one subframe.

14. The UE of claim 13, wherein the first DL sTTI and the second DL sTTI have a same length.

15. The UE of claim 13, wherein at least one uplink sTTI is longer than other uplink sTTIs.

16. The UE of claim 13, wherein one downlink sTTI schedules one uplink sTTI.

* * * * *